(12) United States Patent
Huitema et al.

(10) Patent No.: US 10,254,795 B2
(45) Date of Patent: Apr. 9, 2019

(54) ATTACHABLE, FLEXIBLE DISPLAY DEVICE WITH FLEXIBLE TAIL

(71) Applicant: Polyera Corporation, Skokie, IL (US)

(72) Inventors: Hjalmar Edzer Ayco Huitema, Belmont, CA (US); Ann Torres, San Francisco, CA (US)

(73) Assignee: FLEXTERRA, INC., Skokie, IL (US)

( * ) Notice: Subject to any disclaimer, the term of this patent is extended or adjusted under 35 U.S.C. 154(b) by 71 days.

(21) Appl. No.: 15/148,794

(22) Filed: May 6, 2016

(65) Prior Publication Data

US 2016/0327987 A1 Nov. 10, 2016

Related U.S. Application Data

(60) Provisional application No. 62/157,801, filed on May 6, 2015.

(51) Int. Cl.
*G09G 5/00* (2006.01)
*G06F 1/16* (2006.01)
(Continued)

(52) U.S. Cl.
CPC ........... *G06F 1/1652* (2013.01); *G04G 21/00* (2013.01); *G06F 1/163* (2013.01); *G06F 1/1632* (2013.01);
(Continued)

(58) Field of Classification Search
CPC ........ G06F 1/163; G06F 1/1694; G06F 3/017; G06F 1/1637; G06F 1/1652; G06F 2203/04102; G06F 3/014; G06F 1/1601; G06F 3/011; G06F 3/03547; G06F 3/0416; G06F 3/0488; G06F 1/16; G06F 1/1698; G06F 3/033; G06F 3/0481;
(Continued)

(56) References Cited

U.S. PATENT DOCUMENTS 5,707,745 A   1/1998   Forrest et al.
5,844,363 A   12/1998  Gu et al.
(Continued)

FOREIGN PATENT DOCUMENTS

WO    WO-2015/100404 A1    7/2015

*Primary Examiner* — Duc Q Dinh
(74) *Attorney, Agent, or Firm* — Marshall, Gerstein & Borun LLP

(57) ABSTRACT

An attachable article or device, such as a wristband, includes a flexible electronic display disposed thereon in a manner that is bendable or conformable to a user's wrist or other curved surface, and that enables various images to be displayed on the electronic display in a manner that is easily viewable to the user. The article further includes a connection mechanism that releasably connects the two ends of the article together. The article can, in some cases, include two different sized tail segments. As the shorter tail segment of the article tends to be subjected to more stress over time, the article can be structured in a manner that mitigates the amount of stress to which the shorter tail segment is subjected to over time, while at the same time maintaining a maximum, viewable display area on the shorter tail and longer tail segments of the article, particularly when the shorter tail segment is curved to a greater degree (e.g., when curved around a user's wrist).

20 Claims, 22 Drawing Sheets

(51) Int. Cl.
*G06F 3/0488* (2013.01)
*G04G 21/00* (2010.01)
*G06F 3/01* (2006.01)

(52) U.S. Cl.
CPC ............ *G06F 1/1694* (2013.01); *G06F 3/017* (2013.01); *G06F 3/04883* (2013.01); *G06F 3/04886* (2013.01); *G09G 5/00* (2013.01); *G06F 2203/04102* (2013.01)

(58) Field of Classification Search
CPC ............... G06F 3/04812; G06F 3/0346; G06F 19/3406; G06F 3/0317; G06F 3/0362; G06F 3/038; G06F 3/0383; G06F 3/0484; G06F 3/04842; G06F 1/1616; G06F 1/169; G06F 2207/3868; G06F 2203/04803; G09G 3/2092; G09G 2310/0221; G09G 5/003; G09G 5/37; A61B 5/6804; A61B 5/681; A61B 5/02438; A61B 2090/372
USPC .................................................. 345/173–181
See application file for complete search history.

(56) References Cited

U.S. PATENT DOCUMENTS

| | | | |
|---|---|---|---|
| 5,930,026 A | 7/1999 | Jacobson et al. | |
| 6,097,147 A | 8/2000 | Baldo et al. | |
| 6,303,238 B1 | 10/2001 | Thompson et al. | |
| 6,585,914 B2 | 7/2003 | Marks et al. | |
| 6,608,323 B2 | 8/2003 | Marks et al. | |
| 6,831,769 B2 | 12/2004 | Holman et al. | |
| 6,839,158 B2 | 1/2005 | Albert et al. | |
| 6,991,749 B2 | 1/2006 | Marks et al. | |
| 7,170,670 B2 | 1/2007 | Webber | |
| 7,374,702 B2 | 5/2008 | Marks et al. | |
| 7,446,945 B2 | 11/2008 | Kuiper et al. | |
| 7,528,176 B2 | 5/2009 | Marks et al. | |
| 7,569,693 B2 | 8/2009 | Marks et al. | |
| 7,605,225 B2 | 10/2009 | Marks et al. | |
| 7,605,394 B2 | 10/2009 | Marks et al. | |
| 7,671,202 B2 | 3/2010 | Marks et al. | |
| 7,816,480 B2 | 10/2010 | Marks et al. | |
| 7,842,198 B2 | 11/2010 | Marks et al. | |
| 7,892,454 B2 | 2/2011 | Facchetti et al. | |
| 7,893,265 B2 | 2/2011 | Facchetti et al. | |
| 7,902,363 B2 | 3/2011 | Facchetti et al. | |
| 7,947,837 B2 | 5/2011 | Marks et al. | |
| 7,981,989 B2 | 7/2011 | Yan et al. | |
| 7,982,039 B2 | 7/2011 | Marks et al. | |
| 8,017,458 B2 | 9/2011 | Marks et al. | |
| 8,022,214 B2 | 9/2011 | Facchetti et al. | |
| 8,093,588 B2 | 1/2012 | Marks et al. | |
| 8,097,877 B2 | 1/2012 | Marks et al. | |
| 8,111,465 B2 | 2/2012 | Heikenfeld et al. | |
| 8,274,075 B2 | 9/2012 | Marks et al. | |
| 8,334,545 B2 | 12/2012 | Levermore et al. | |
| 8,338,555 B2 | 12/2012 | Yan et al. | |
| 8,395,150 B2 | 3/2013 | Marks et al. | |
| 8,725,842 B1 * | 5/2014 | Al-Nasser | G04G 17/08 367/11 |
| 9,600,030 B2 * | 3/2017 | Bailey | G06F 1/163 |
| 9,833,164 B2 * | 12/2017 | Justice | A61B 5/0533 |
| 2010/0252112 A1 | 10/2010 | Watson | |
| 2010/0283047 A1 | 11/2010 | Facchetti et al. | |
| 2010/0326527 A1 | 12/2010 | Facchetti et al. | |
| 2011/0014956 A1 * | 1/2011 | Lee | H04M 1/274525 455/569.1 |
| 2011/0090148 A1 * | 4/2011 | Li | G06F 1/163 345/158 |
| 2011/0120558 A1 | 5/2011 | Facchetti et al. | |
| 2011/0136333 A1 | 6/2011 | Facchetti et al. | |
| 2011/0175089 A1 | 7/2011 | Zheng et al. | |
| 2011/0215334 A1 | 9/2011 | Quinn et al. | |
| 2012/0068314 A1 | 3/2012 | Kastler et al. | |
| 2012/0223314 A1 | 9/2012 | Marks et al. | |
| 2013/0062598 A1 | 3/2013 | Usta et al. | |
| 2015/0025355 A1 * | 1/2015 | Bailey | A61B 5/681 600/390 |

* cited by examiner

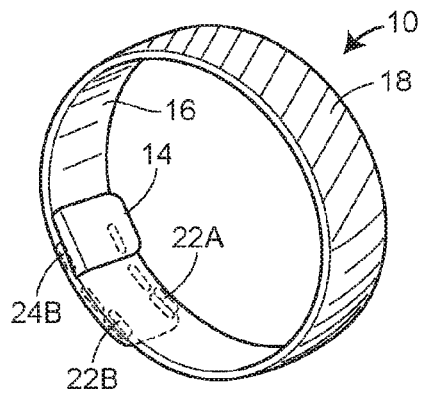
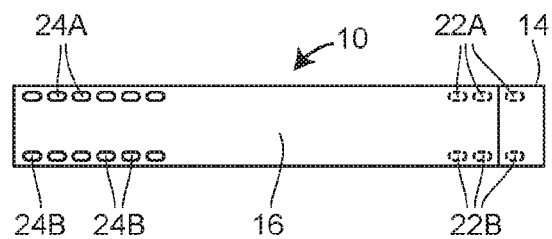
FIG. 7A
FIG. 7B
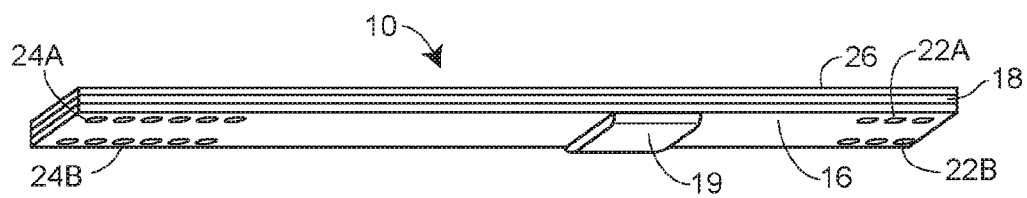
FIG. 7C
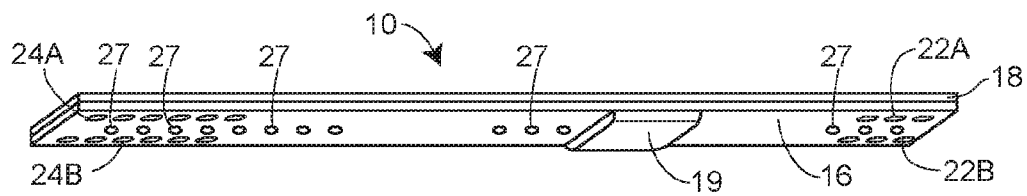
FIG. 7D
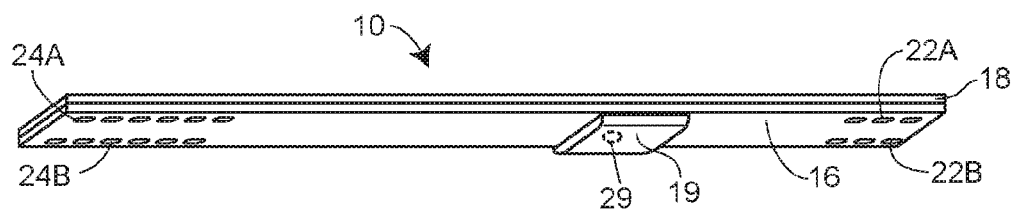
FIG. 7E

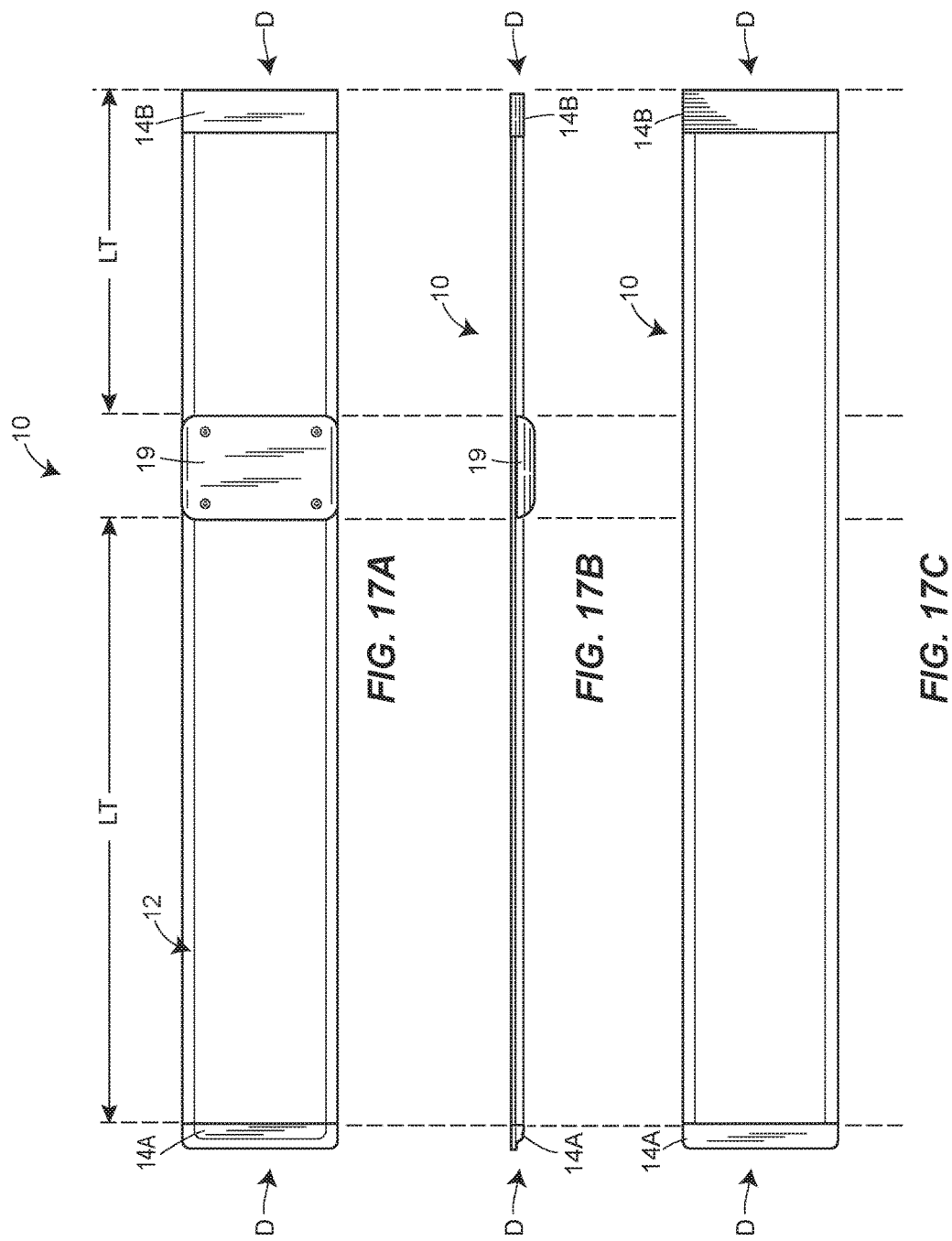

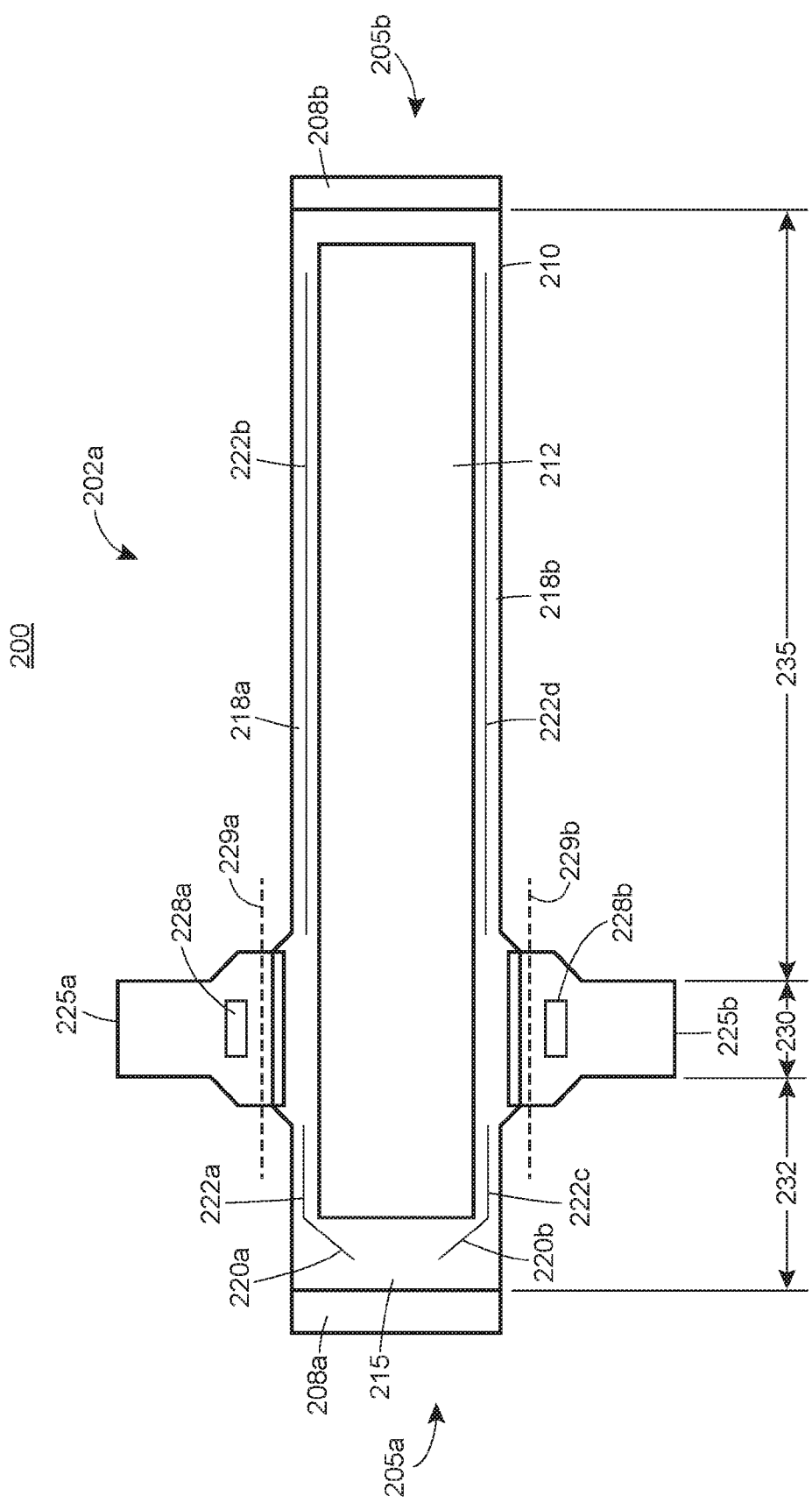

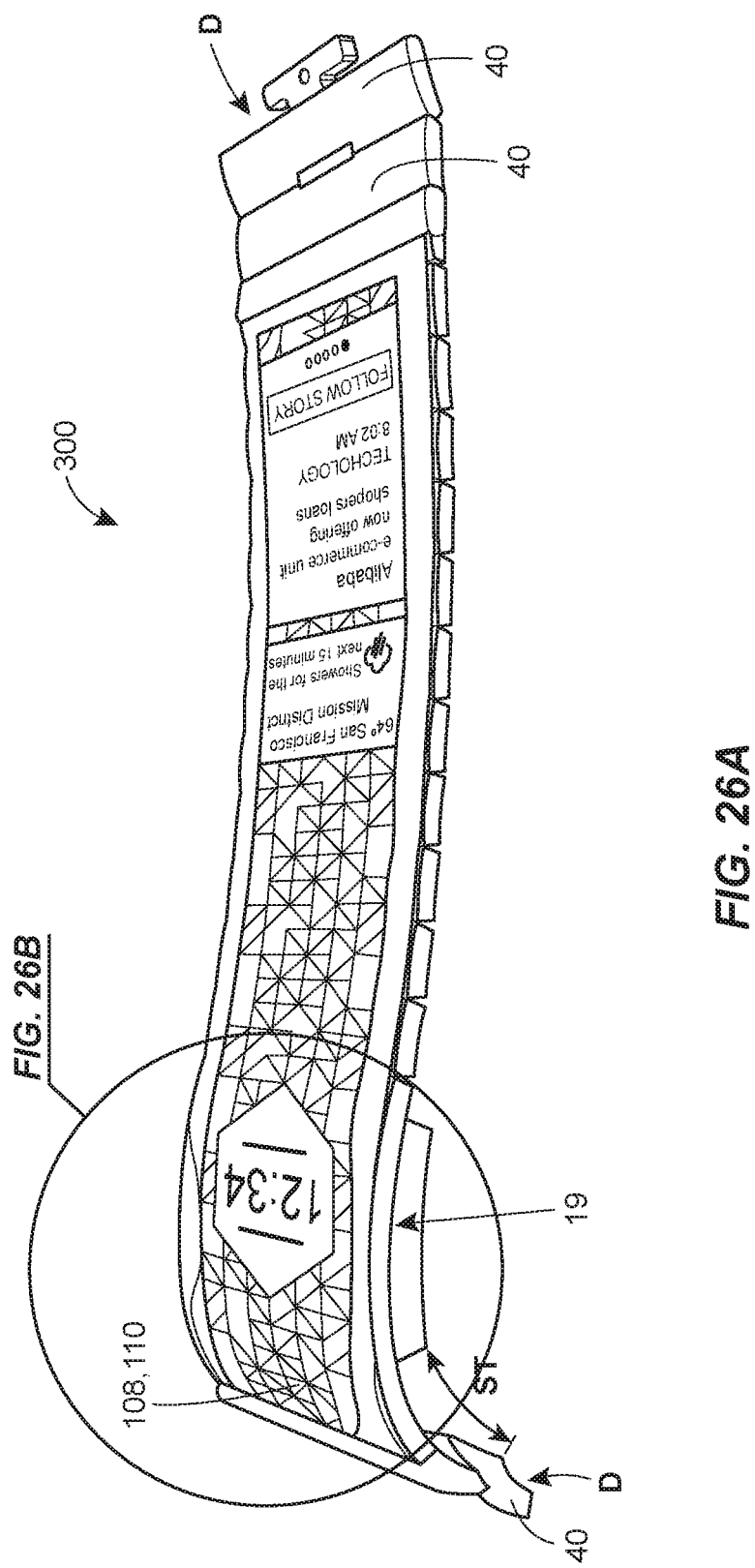

ATTACHABLE, FLEXIBLE DISPLAY DEVICE WITH FLEXIBLE TAIL

CROSS REFERENCE TO RELATED APPLICATIONS

This application claims priority to and the benefit of U.S. Provisional Patent Application Ser. No. 62/157,801, filed on May 6, 2015, the disclosure of which is incorporated by reference herein in its entirety.

TECHNICAL FIELD

This patent application relates generally to dynamically flexible articles, and more particularly to an elongated, dynamically flexible article, such as a band, that includes a dynamically flexible electronic component (e.g., a dynamically flexible electronic display) and a dynamically flexible support structure coupled with the flexible electronic component, that can be mounted on and/or easily attached to other items, such as wrists, arms, mugs, shoes, belts, desktops, cabinets, phones, computers, etc.

BACKGROUND

Electronic displays are commonly installed within flat, hard surfaces of electronic devices, such as computer screens, television sets, smart phones, tablet computers, etc., and in many cases are installed on accessories for the electronic devices, such as removable monitors. Many electronic devices having an electronic display are portable, and have thus become very useful in implementing mobile applications. This fact is particularly true with smart phones which have become ubiquitous, and more recently smart devices that people may wear around their wrists in a watch-like manner. However, unfortunately, typical mobile devices such as known smart phones and smart watches have electronic displays that are flat and rigid in nature. Thus, while these displays are useful in implementing many different applications, the display is typically only visible from one perspective, e.g., while the device is being hand-held, or when the display of the device is positioned on the top of a person's wrist.

While static, flexed displays are generally known and are starting to come into more common usage, e.g., rigid displays that are statically flexed in a single position as seen in some televisions and mobile phones/smart devices, dynamically flexible displays have not been widely incorporated into easily portable items such as items of clothing, wristbands, jewelry, etc. or on items that are easily attached to other items, much less in a manner that makes the display more useable and visible to the user from many different perspectives and in many different scenarios.

SUMMARY

An attachable article or device, such as a wristband or band, includes a dynamically flexible electronic display disposed thereon in a manner that is bendable or conformable to a user's wrist or other curved or even flat surface, and that enables various images to be displayed on the electronic display in a manner that is easily viewable to a user, even when the device or article is positioned in different orientations and/or degrees of curvature with respect to these user's eyes. The attachable article with such a dynamically flexible electronic display may be attached to or worn on a user's body, such as in the form of a wristband or on a shoe or a belt, and may bend to fit the various contours or body surfaces on which the electronic display is located. The attachable article is also easily attached to other items, such as mugs, cups, computers, phone covers, bike handles, automobile dashboards, etc., that enable the flexible display to be viewed when not being held in one's hands. The electronic display of the attachable article is thus, in many cases, viewable to a user and is capable of being manipulated or actuated by the user without having to be held in one or both of the user's hands, making the electronic device useable while the user is engaged in or performing other activities, such as running, biking, etc. Further, the viewable areas of the dynamically flexible electronic displays may be visible in numerous different planes and from numerous different angles and orientations with respect to the user.

In one case, the attachable electronic device or article includes a dynamically flexible electronic display disposed on a dynamically flexible or bendable support in the form of a generally rectangular or elongated shape, with one or two end pieces, clasps, or fasteners attached to the support that enable the device or article to be releasably attached to itself. Various electronics are disposed in one or more electronic modules that may be within, for example, one or both of the end pieces, and/or may be disposed elsewhere along the length of the rectangular/elongated shape or band. The electronics module includes or connects to one or more display drivers for driving the electronic display to display fixed or changeable messages, artwork, pictures, etc. The electronic module may also include a processor for implementing applications or programming and a memory for storing pictures, images, messages, videos, etc. to be displayed on the electronic display at various times, as well as for storing applications and application data, such as configuration data, to be used by applications for performing various display tasks at different times. The electronic module may further include a battery for powering the electronic display, the processor, the display driver, and other electronic elements, a battery charging device for charging the battery either in a wireless or a wired manner, and a communications module that enables other computer devices to communicate with the processor, the display drivers and the memory to provide new or different images or messages to be displayed on the electronic display, to configure the operation of the electronic display of the attachable electronic device, etc.

As discussed above, it is preferable that the article conform, as best as possible, to the object (e.g., a user's wrist) to which it is attached. Thus, in some cases, the attachable article or device is flexible everywhere except the electronic module, which contains rigid parts. At the same time, it is preferable that the electronic display extend at or from both sides of the electronic module, thereby maximizing the viewable area of the electronic display, such that the article provides the best possible viewing or usage experience. Thus, in some cases, the attachable electronic device or article can include two tails, e.g., a shorter tail and a longer tail, that extend in opposite directions from the electronic module, and, as such, provide a continuation of the viewable display area extending in opposite directions from the electronics module. Moreover, a flex connector to the display can be positioned at or in one of the two tails (e.g., the shorter tail). However, such an arrangement is difficult to produce, as one of the tails will have the display and the flex connector extending between the electronic module and the display running over or in that tail. As a result, significant stress may be placed on the flex connector, particularly when the shorter tail portion of the article is bent. Accordingly, the electronic device or article can be structured in a manner that mitigates the amount of stress to which the shorter tail portion, particularly the flex connector positioned at or in the shorter tail portion, is subjected to over time, while at the same time maintaining a maximum, viewable display area on the shorter tail and longer tail portions of the article, particularly when the shorter tail portion is curved to a greater degree (e.g., when curved around a user's wrist). As will be described herein, the electronic device can be structured in a number of different ways to dually satisfy these objectives, with the different options providing varying degrees of flexibility.

The dynamically flexible electronic display may be fabricated using any desired flexible electronic display material, such as any of various suitable plastics. If desired, the dynamically flexible electronic display may be manufactured as a display having pixel elements disposed on separate frontplane and backplane substrates formed of the same or different flexible material. In some cases, such as the case in which e-paper is used as the flexible display, a separate layer of material may be disposed between the frontplane and the backplane materials to form pixel elements. In any case, these substrate materials may be placed together to form the flexible electronic display, which may then be disposed on a flexible support, the combination of which can be dynamically flexed or curved in various manners to conform to the shape of a portion of a wearer's body, such as a wrist, a foot, etc. or to conform to the shape of other items to which the attachable article may be attached.

The flexible support may limit the bending motion of the flexible display to prevent the display from bending to a degree so that the electronics may be compromised. In an embodiment, an attachable article includes a generally rectangular shaped or elongated flexible support having first and second longitudinal sides and first and second transverse sides extending between the first and second longitudinal ends, where the lengths of the longitudinal sides are greater than the length of the transverse sides. The flexible support has a multiplicity of interconnected pieces that each extend between the first and second transverse sides and/or the first and second longitudinal sides of the substrate that operate together to limit the bending motion of the flexible substrate to a particular minimum bending radius in one or more dimensions. The attachable article may also include a dynamically flexible electronic display disposed on the flexible support (e.g., along the majority of the length of the flexible support), where the flexible electronic display has a minimum critical bending radius at which the flexible electronic display can be bent without impairing electronic functionality of the flexible electronic display. Such a minimum critical bending radius may be the bending radius past which the electronic functionality of the flexible display becomes impaired upon a single or a low number of bendings (e.g., bending the flexible display past the minimum critical bending radius the first, second, third, etc., time results in impaired functionality), or may be the bending radius past which the electronic functionality of the flexible display is not reliable or may become impaired upon a significant number of bending motions (e.g., the minimum critical bending radius may be the largest minimum radius at which the electronic display may be reliably bent a significant number of times without becoming impaired). In some cases, the particular minimal bending radius of the flexible support in the longitudinal direction of the support may be greater than or equal to the minimal critical bending radius of the flexible electronic display in the transverse direction of the support, e.g., when the device or article has a rectangular or band shape. Moreover, these bending radii may be different (or the same) along each direction when the display or other flexible electronic component is bent to be concave and convex.

If desired, in an embodiment, the flexible support may include a series of rigid pieces of material interconnected with hinges, wherein the hinges limit bending of the flexible electronic display when disposed on the flexible support within the bending tolerance of the flexible electronic display. The rigid pieces of material may be disposed longitudinally and/or transversely along the substrate and the hinges may include protrusions that interact to limit the range of bending motion of the hinge. In some embodiments, the flexible support may have two portions disposed longitudinally or transversely adjacent to one another, wherein the first portion can be bent to a minimum radius of curvature that is different than the minimum radius of curvature to which the second portion can be bent. In some embodiments, the flexible support may have a plurality of sections disposed longitudinally or transversely with respect to one another along the substrate, wherein each section can be bent to one of a multiplicity of minimum radii of curvature, and wherein at least two of the sections can be bent to a minimum radius of curvature that is less the minimum radius of curvature of one of the other sections.

In another case, the attachable electronic device may include a flexible, for example, transparent, touch screen interface disposed over or on top of the flexible electronic display to enable a user to input data or take input actions with respect to the flexible electronic display. In some cases, the inputs may be in the form of gestures that cause the electronic device to operate in a predetermined manner, to change modes of operation, etc.

The electronic display device, so formed may, for example, enable a user to have a single type or multiple different types of digital media depicted or displayed on the display at the same time, including, for example, photographs, digital artwork created by the user or others, messages sent to or created by the user, reminders, notes that provide instructive, educational or inspirational messages, e-cards, advertisements, personalized agendas, calendars, such as a personalized Outlook® calendar, etc.

More particularly, the display driver may be configurable to drive the electronic display by displaying thereon one or more images, messages, digital artwork, videos, etc., stored in the memory. The display driver may display a fixed image via the flexible electronic display, may change the image being displayed on the flexible electronic display from time to time, such as by accessing the memory and providing a new image to the display, may display videos, such as real time videos, and/or may display other types of digital media. Likewise, the display driver may display various interfaces associated with many different applications at different times or in different modes of the attachable electronic device. For example, the display driver may be driven by various different applications run in a processor to display a calendar interface, an e-mail in-box interface, an alarm clock interface, a keyboard interface, a step-counter interface, etc. These interfaces may be located on the same place on the flexible display and displayed at different times and may be located at different places on the flexible display and displayed at the same or at different times.

Further, a battery charger unit may be connected to the battery and may operate to charge the battery using, for example, an inductively coupled charging technique. The battery charger unit may be a part of an inductively coupled charging system and may respond to electromagnetic waves produced by an exterior charging unit to charge the battery when the attachable article is disposed near the external charging unit. In another case, the battery charger may be a kinetic energy charger unit that converts motion of the device (such as that associated with movement of an arm when the attachable electronic device is in the form of a wristband) into electrical energy which is then used to charge the battery.

Still further, a communications module may enable the processor, the driver, the memory and/or the flexible electronic display to communicate with external sources or devices, such as a computer, a mobile phone, a tablet device, a remote control unit, etc., using, for example, wireless communications produced using a Wi-Fi network, a cellular network, a Bluetooth connection, a near-field communications (NFC) connection, an infrared communication technique, a radio frequency identification (RFID) device or tag, etc. The communications module may operate to enable the driver to receive new images or other digital media for storage in the memory and ultimate display on the flexible electronic display, new applications for execution by the driver to perform control of the electronic display in various manners and new configuration information for configuring the manner in which the display driver controls the flexible electronic display to operate to display images and other information. In this manner, a user may reprogram the attachable article via, for example, a wireless communication network to display different pictures, images, messages, etc., at different times, to execute different applications at different times or in different locations. The communications module operates to eliminate the need for the attachable device to be plugged into a computer, or otherwise to have wires connected thereto for writing information to the memory of the device.

Additionally, the memory may store, and the processor may execute, one or more applications provided or downloaded to the attachable electronic device by the user. These applications may enable the user to direct or program the operational features of the attachable device with the flexible electronic display, such as the particular digital media or images to display at any given time, the order in which images are to be displayed, the speed at which images will change, display features, such as background colors, borders, visual effects, etc. Moreover, the applications may enable or perform communications via the communications module to obtain information that may be displayed on the flexible electronic display, such as e-cards, advertising or promotional information, etc. provided via, for example, a Wi-Fi connection, a cellular connection, a Bluetooth or NFC connection, or any other wireless communications network or connection.

In one case, the processor, which may be a generally purpose micro-processor type of controller or a special purpose controller, the battery, the battery charger unit, the computer readable memory and the communications module may be integrated within, for example, an endpiece or a side wall of the attachable article and these components may be sealed or otherwise protected from water, air, dirt, etc. to which the exterior of the device is exposed. Any or all of these electronic components may be encapsulated in a hermetically sealed manner to prevent any direct exposure of these components to exterior forces and environmental hazards.

Still further, the flexible display be configured to present the maximal display area on upper the surface of the attachable article by being formed such that the edges of the flexible display on which lead lines that are used to energize a display area of the flexible display are bent or folded down or under the display. Such a configuration limits or reduces the need to have an area on the upper or outer surface of the attachable article at which no display pixels are located. Further, such a configuration allows for a maximal viewing surface for a wearer of the device or article. For example, by particularly configuring the article or device so that the display drivers and lead lines emanating from the display are bent or folded down under the display at particular locations, and/or by particularly configuring one or more tails of the flexible device article (e.g., one or more ends or shorter sides of the generally rectangular article or device), a maximal viewing surface along the length of the article or device may be provided to a wearer of the article or device.

BRIEF DESCRIPTION OF THE DRAWINGS

FIGS. 7A and 7B illustrate perspective and top views, respectively, of an example attachable article in the form of a wristband having magnetic members disposed on one or both ends or sides of the wristband to form an adjustable connection or clasping structure.

FIGS. 7C-7E illustrate various sensors disposed on a wristband device similar to that of FIGS. 7A and 7B.

FIGS. 17A-17C illustrate a bottom view, a side view and a top view, respectively, of a wristband device configured to provide maximal continuous display surface to a user when wearing the band.

FIG. 25 illustrates an elongated, dynamically flexible article with zones of different flexibilities.

FIG. 26A illustrates an elongated, dynamically flexible article with a rigid short tail, such that the article mitigates the stresses to which the short tail would be subject to over time.

DETAILED DESCRIPTION

Figure 1:
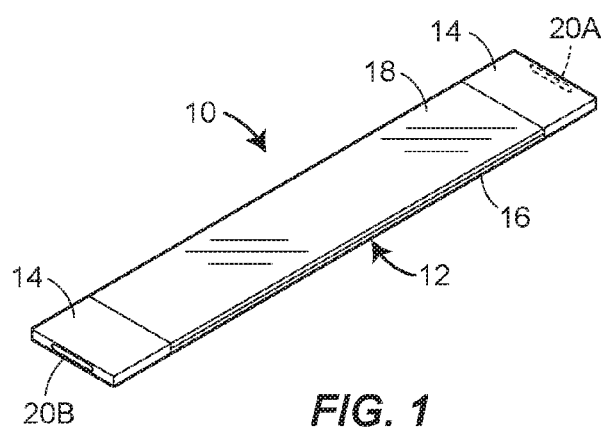
FIG. 1 is a perspective view of an example dynamically flexible, attachable article in the form of a wristband having a flexible display disposed thereon and a first type of magnetic clasp.

Referring now to FIG. 1, an attachable article 10 includes a flexible band portion 12, which is generally rectangular or otherwise elongated in shape and configuration, disposed between two end pieces or clasps 14. The band portion 12 includes a flexible substrate 16 and a flexible electronic display 18 disposed on the substrate 16 to be viewable from the top of the band 12, as illustrated in FIG. 1. One or more of the end pieces or clasps 14, each of which may be made of hard plastic or other rigid material, but could instead be made of a pliable material, may include various electronic components therein for driving the flexible electronic display 18 and for providing other electronic functionality for the article 10, however, one or more electronics components may be additionally or alternatively disposed elsewhere along the length of the band 12, in some embodiments.

For ease of discussion but not for limitation purposes, the dynamically flexible, attachable article or device 10 is generally described herein as a band that may be wrapped around another object and that has a relatively large aspect ratio, e.g., an aspect ratio where the length of the display area of the device 10 is at least two times greater than the width of the display area, and, in some configurations, is at least five times greater than the width. For example, the attachable article or device 10 may be a wristband. However, it is understood that any one or more of the techniques discussed herein may easily be applied to other sizes and shapes of dynamically flexible, attachable articles or devices, e.g., to longer devices, shorter devices, devices having different aspect ratios, square devices, oval devices, circular devices, and/or devices of any other types of shapes and dimensions.

Figure 2:
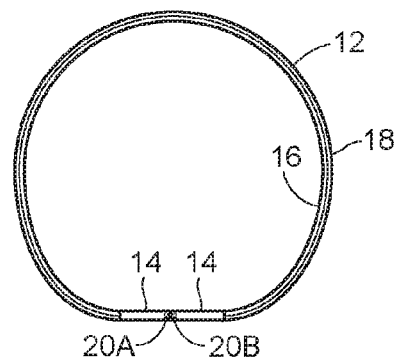
FIG. 2 is a side view of the wristband of FIG. 1 bent to form a fixed length wristband.

As illustrated in FIG. 1, one or both of the end pieces or clasps 14 may include a fastener or connection structure therein that functions to connect the end pieces 14 together when the band portion 12 is bent, as illustrated in FIG. 2, to form a circular or oval band. In one case, the connection structure may be in the form of magnetic materials 20A and 20B disposed in or on each of the clasps 14, wherein the materials 20A and 20B operate, when in close proximity to one another, to hold the end pieces or clasps 14 together. The magnetic materials 20A and 20B can each be a permanent magnet, or one of the materials 20A or 20B can be a permanent magnet while the other material 20A or 20B can be a magnetically permeable material, such as many kinds of metal. The magnetic materials 20A and 20B can be disposed at the longitudinal ends of the clasps 14 so that the clasps 14 connect end-to-end when the band 12 is bent to allow the clasps 14 to meet up with each other end-to-end, as illustrated in FIG. 2. In the case in which the materials 20A and 20B are both permanent magnets, the materials 20A and 20B may be disposed in ends of the clasps 14 so that opposite poles of the permanent magnets are facing outwardly from the clasps 14 or so that the magnets have their respective north poles facing in opposite directions when the band portion 12 is bent in the manner shown in FIG. 2 (e.g., so that a south pole of one of the magnets 20A and 20B meets or mates with a north pole of the other one of the magnets 20A and 20B). As will be understood, the configuration and placement of the materials 20A and 20B in the clasps 14 in the manner illustrated in FIG. 1 enables the device 10 to be clasped in a continuous circle with a fixed or predetermined length so that the clasps 14 meet end-to-end.

Figure 3:
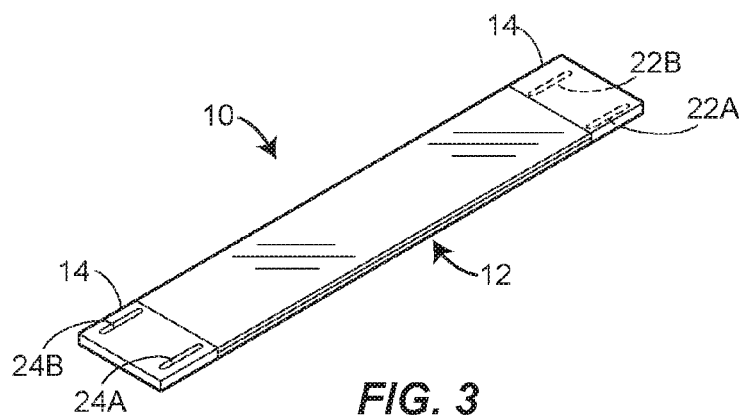
FIG. 3 is a perspective view of an example dynamically flexible, attachable article in the form of a wristband having a flexible display disposed thereon with a second type of magnetic connection mechanism.
Figure 4:
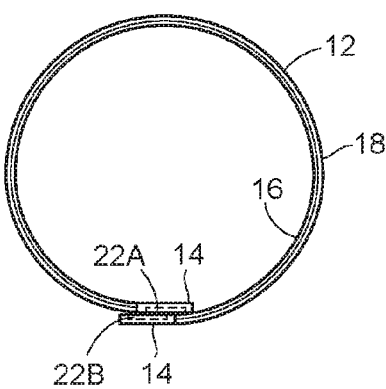
FIG. 4 is a side view of the example attachable article of FIG. 3 bent to form an adjustable length wristband.

In another embodiment illustrated in FIG. 3, the flexible attachable article 10, again illustrated in the form of a wristband, includes a similar band portion 12 and end pieces or clasps 14. However, in this case, the clasps 14 have a connection structure in the form of magnets disposed on the top or bottom sides of the clasps 14 (and possibly even a portion of the band 12) to enable the device 10 to be folded around on itself in an adjustable manner as illustrated in FIG. 4 so as to create a wristband of variable length when disposed around or connected around a wrist or other object. As illustrated in FIGS. 3 and 4, magnets or magnetic members 22A and 22B are disposed on or near a lower side of one the clasps 14, and come into contact or react with magnets or magnetic members 24A and 24B disposed on or near an upper side of the other one of the clasps 14. In some cases, the magnets or magnetically permeable elements or members 24A and 24B may be disposed within the support 16, such as in the center of the support 16, instead of on or near an upper or lower surface of the support 16. In these configurations, the clasps 14 may be disposed near or on top of one another during use and are thus connectable in various different positions with respect to one another, such as that illustrated in FIG. 4, when the flexible band 12 is bent to form a circular member to be placed around a mounting member such as a wrist, a leg, a bicycle handle bar, etc., for example. In this manner, the dynamically flexible, attachable device 10 may be easily adjustable in size to fit various different sized mounting members. As illustrated in FIG. 4, the support or flexible material 16 of the band portion 12 is illustrated as being flexed in a manner that causes the flexible display 18 to be disposed on the exterior or outside of the band portion 12. Of course, in the configuration illustrated in FIG. 4, the magnets or metallic members 22A and 22B on the one side, and the magnets or the metallic members 24A and 24B on the other side of the band portion 12 may slide with respect to one another in the longitudinal direction of the device 10 so as to make the device 10 variable in size or circular shape to fit around different sized wrists or other mounting members. Of course, if desired, portions of the members 22A, 22B and/or 24A, 24B could be disposed in the band portion 12 in addition to or instead of in the clasps 14 and, if so disposed, would still be considered as being disposed in the end portions of the band 12. Still further, any or all of the magnetic members 22A, 22B, 24A, 24B could be a single, long piece of material, as illustrated in FIGS. 3 and 4, or could be a series of magnetic members disposed near but not contacting each other, to enable better registration of the north and south poles of the respective magnetic members in various different longitudinal locations of the band 12. This second configuration may provide for better adjustability of the length of the band 12 when both magnetic members 22 and 24 are permanent magnets.

Figure 5A:
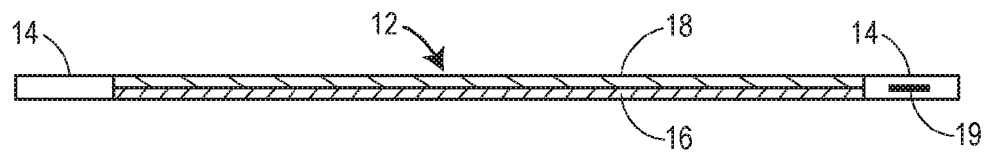
FIG. 5A is a side view of an example attachable article of FIG. 1 having a flexible display disposed on a flexible support between two clasps.

Of course, the dynamically flexible, attachable device 10 could take on many different configurations besides those illustrated in FIGS. 1-4. For example, as a reference, FIG. 5A illustrates a side view of the device 10 of FIGS. 1-4 in more detail. In this case, the band portion 12 is illustrated as including a flexible base or a support portion 16 that may be made of any suitable flexible material such as, for example, cloth, leather, plastic or other material and/or pieces thereof, while the flexible display 18 is disposed on the support 16. In other cases, the support portion 16 can be made of a rigid or semi-rigid material (e.g., hard plastic) and/or can be coupled to the flexible display 18 in a different manner. For example, the support portion 16 and the flexible display 18 can be movably (e.g., slidably) coupled to one another, such that the support 16 and the flexible display 18 can move relative to one another when the device 10 is bent. In another example, the support portion 16 can be integrally formed with the display 18.

The clasps 14 may be the same size as each other and may be the same height as the flexible display 18 and the support 16 together. In another case, the clasps 14 may be larger in height than the flexible display 18 and the support 16 and, in this case, may stick out above surface of the flexible display 18 and/or below the bottom surface of the support 16. As noted above, one or both of the clasps 14 may be or include an electronics module 19 that holds electronics, such as processors, memories, sensors, batteries, etc. that are used to power and drive the flexible display 18 and to provide other communication functionality for the device 10. In some embodiments, at least a portion of the electronics module 19 is not included in the clasps or fasteners 14, but is attached to the band 12 in one or more locations separate from the fasteners 14. If desired, the components of the electronics module 19 may be sealed or otherwise protected from water, air, dirt, etc. to which the exterior of the device 10 is exposed. For example, any or all of these electronic components may be encapsulated in a hermetically sealed manner to prevent any direct exposure of these components to exterior forces and environmental hazards.

Figure 5B:
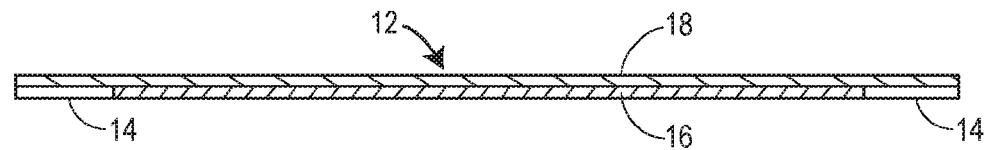
FIG. 5B is a side view of an example attachable article in the form of a wristband having a flexible display disposed over an entire length of a support.

In another embodiment, as illustrated in FIG. 5B, a dynamically flexible, attachable article in the form of a device 10 has the flexible display 18 disposed over the entire length of the support 16 and end portions 14, which may be part of the support 16. In this case, the flexible display 18 spans the entire length of the band portion 12 and of the device 10 and thus extends from end to end of the device 10. The fasteners or connection structure, in the form of, for example, magnets (not shown in FIG. 5B) may be disposed in the end pieces 14 and/or, if desired, in portions of the flexible support 16.

Figure 5C:
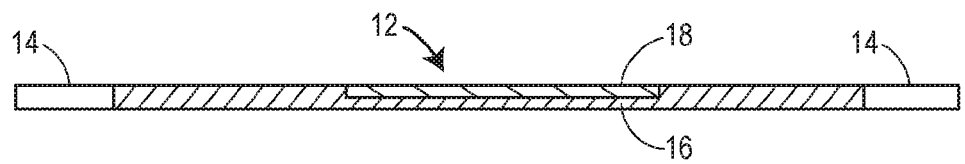
FIG. 5C is a side view of an example attachable article in the form of a wristband having a flexible display disposed on a center portion of a flexible support.

In yet another configuration, as illustrated in FIG. 5C, a dynamically, flexible attachable article 10 has a flexible display 18 disposed on a limited portion of the flexible support 16 so that the flexible display 18 is only disposed, in this case, in the center portion of the band 12. Of course, while not shown, the flexible display 18 could be disposed on any other portion of the band 12, including in portions offset from the center of the band 12 and the flexible display 18 could cover any desired amount or portion of uppers surface of the band 12. Here again, any desired connection structure could be provided in the ends of the support 16, including in the clasps 14, to connect the two ends of the band 12 together.

Figure 5D:
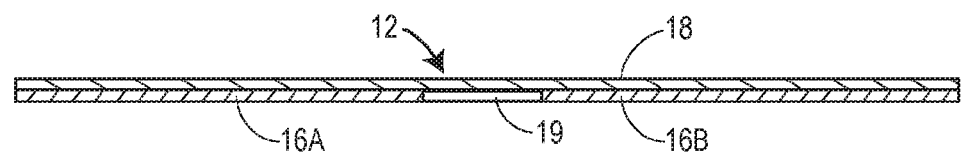
FIG. 5D is a side view of an example attachable article in the form of a wristband having a flexible display disposed over a support having two flexible end pieces connected by an electronics module.

In a still further case, as illustrated in FIG. 5D, a dynamically flexible, attachable article 10 has a flexible display 18 disposed over a support 16 having two flexible end pieces 16A and 16B connected by an electronics module 19 which, in this case, is illustrated is being disposed in the center of the flexible support 16. The electronics module 19 may or may not be made of a flexible material and in either case is still part of the flexible support 16. Moreover, while being illustrated in the center of the support 16, at least a portion of the electronics module 19 could be additionally or alternatively disposed at any other location along the support 16 including at any position offset from the center of the support 16. While the electronics module 19 is illustrated as being curved (i.e., does not have a rectangular shape), it will be appreciated that the electronics module 19 can have a flat (e.g., rectangular) shape or some other shape. Again, any desired fastener or connection structure could be attached to or disposed in or on the end portions of the device 10, including the ends of the support 16.

Figure 5E:
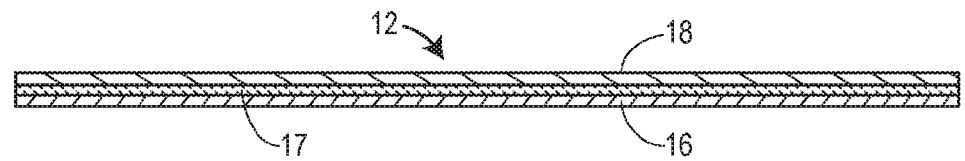
FIG. 5E is a side view of an example attachable article in the form of a wristband having a flexible display coupled to a flexible support via an interlayer disposed therebetween.

In a still further case, as illustrated in FIG. 5E, a dynamically flexible, attachable article 10 has a flexible display 18 disposed over a support 16 and coupled to the support 16 via an interlayer 17 disposed therebetween. In some cases, the interlayer 17 only serves to couple portions or segments of the display 18 to corresponding portions or segments of the flexible support 16. The interlayer 17 can be or include one or more un-patterned and/or patterned layers, such as, for example, one or more layers of foam, rubber, visco-elastic, adhesive, co-elastic material, stretchable material, other suitable material(s), or combinations thereof.

It will be appreciated from FIGS. 1-5 that the flexible display 18 can continuously span (i.e., extend) the entire length of the band 12 or can instead continuously span only a portion of the length of the band 12. In instances in which the flexible display 18 only spans a portion of the band 12, the flexible display 18 may, for example, continuously span only ¼, ⅓, ½, ⅔, ¾, more than ¼ but less than ⅓ or ½, more than ⅓ but less than ½, more than ½ but less than ⅔ or ¾, more than ⅔ but less than ¾, more than ¾ but less than the entirety, or some other portion or fraction, of the length of the band portion 12. Other ranges are of course possible as well.

Figure 6:
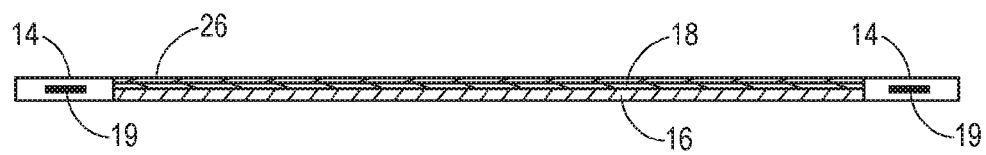
FIG. 6 is a side view of an example attachable article in the form of a wristband having a flexible touch screen disposed on a flexible display and a flexible support which are disposed between two clasps.

In another embodiment, as illustrated in FIG. 6, the dynamically flexible, attachable article 10 may be configured similarly to that of FIGS. 1-5D, but may also include a touch screen interface 26 disposed over the flexible display 18. In particular, in this case, the touch screen interface 26 can be a capacitive touch screen or any other type of touch screen interface that is transparent in nature, and thus can be laid over top of the flexible display 18 to allow the flexible display 18 to be viewable there-through. In other cases, the touch screen 26 can be disposed else (e.g., under the display 18) or can be integrated with the flexible display 18. Further yet, the touch screen interface 26 can take the form of any other suitable touch screen terminology. As will be understood, the touch screen interface 26 of FIG. 6 is powered by and controlled by the electronics disposed within one or more electronics modules 19 illustrated as being disposed, in this case, in both of the clasps 14 to perform various different types of touch detection functionality associated with a typical touch screen display. Of course, the touch screen interface 26 could be added to any of the configurations of FIGS. 5A-5D or to any of the other attachable article embodiments described herein.

While the device 10 of FIGS. 1-6 is generally illustrated as having a flexible display and a flexible support disposed between or including two magnetically coupled clasps 14, with at least one of the clasps 14 containing or operating as an electronics module 19, other manners of disposing connection structure on the device 10 and of locating one or more portions of the electronics module 19 could be used instead. For example, FIGS. 7A and 7B illustrate an example dynamically, flexible attachable article 10 in the form of a wristband having a single clasp member 14, such as one of clasps members 14 of FIGS. 1-6, disposed at one end of the flexible display 18 and a set of magnets 22 and 24 or other magnetically permeable material disposed on or in an end piece or end portion attached to or formed as part of the other end of the flexible support 16. In this case, individual magnets 22A and 22B are disposed in a spaced apart manner within the end piece 14 or are disposed in the flexible support 16 next to the end piece 14 and operate in conjunction with the individual magnetic materials 24 which are spaced apart and disposed on the other end piece of the band 12 to form a secure magnetic connection when the band portion 12 is wrapped around a user's wrist, for example. The spaced apart nature of the individual magnetic members 22 and 24 enable the band to be adjustable in length so that a pair of magnetic members 22A and 22B (on opposite sides of one end of the band 12 or support 16) may meet up with any of a number of different pairs of magnets 24A and 24B (on opposite sides of the other end of the band 12 or support 16) to enable the length of the band, when connected, to be adjustable. Of course, the magnetic members 22 and 24 may each be permanent magnets, or one may be made of permanent magnets while the other is formed of magnetically permeable material. Of course, the spaced apart magnetic material configuration of FIGS. 7A and 7B may be used in any of the embodiments illustrated in FIGS. 1-6.

FIGS. 7C-7E illustrate attachable articles similar to that of FIGS. 7A and 7B but including various different types of sensors that may be used for various purposes, including in detecting the orientation of the band, such as whether the band is wrapped around a user's wrist or other element. In particular, FIGS. 7C-7E illustrate various examples of an attachable article in the form of a wristband device 10 that includes an adjustable clamp or connection mechanism for enabling the ends of the band of the device 10 to overlap one another by different distances when worn so as to enable the wristband device 10 to be used on wrists of different sizes. In addition, however, each of the various devices in FIGS. 7C-7E include mechanisms for determining or enabling the electronics module 19 of the device 10 to determine the orientation of the band with respect to the user's wrist when being worn to enable better operation of the display features of the device 10. While a magnetic connection or clamping structure is illustrated in each of the devices 10 in FIGS. 7C-7E, other types of adjustable clamping or connection structure could be used instead and allow the electronics module 19 to be able to determine the orientation or positioning of the band or the display 18 when on the arm or wrist of a user.

More particularly, FIG. 7C illustrates an example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band 16 from one end of the band 16 and two-thirds of the length of the band 16 from the other end of the band 16. In addition, the device 10 of FIG. 7C includes a flexible touchscreen interface 26 disposed over the flexible electronic display 18.

FIG. 7D illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible band support 16 at approximately one third of the length of the band support 16 from one end of the band 16 and two-thirds of the length of the band 16 from the other end of the band support 16. However, in this case, one or more pressure sensors 27 are disposed in or on the band support 16 and are electronically connected to the electronics module 19 to provide signals to the module 19 indicative of pressure, strain, or force applied to those locations of the band 16. While the pressure sensors 27 are indicated to be disposed at various points along the length on the band support 16 on both sides of the band support 16 near the ends of the support 16, these sensors may be disposed along the entire band support 16, only on one side of the support 16, or on any suitable portion of the support 16 for the purpose of detecting pressure or force applied to the band support 16 or display screen 18. Still further, the pressure sensors 27 may be any desired or suitable pressure sensors including piezoelectric sensors, strain gauges, etc. Additionally, any desired number of sensors 27 may be used and these sensors 27 may be spaced apart from one another any suitable distance along the length of the band support 16. Likewise, the sensors 27 may be disposed in the center of the band support 16 (from side to side) or offset from the center. Also, more than one sensor 27 may be located at any longitudinal location along the band support 16. Alternatively, the sensors 27 of FIG. 7D could be magnetic sensors which sense magnetic field strength, for example. In this case, the magnetic sensors 27 may detect whether one or more magnets on one end of the band (used a part of the coupling mechanism) are near to or are interacting with magnets or magnetic material on the other end of the band. Here, the magnetic sensors 27 may be used to detect the amount of overlap of the ends of the band.

FIG. 7E illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible band support 16 at approximately one third of the length of the band support 16 from one end of the band 16 and two-thirds of the length of the band 16 from the other end of the band support 16. However, in this case, a gyroscopic detection element 29 is dispose in the electronic module 19 and operates to detect the orientation of the band (or at least the electronics module 19 or other location at which the gyroscopic element 29 is disposed). The gyroscopic element 29 operates to detect the orientation of the band with respect to gravity or other acceleration force to which the element 29 is subjected. While a single gyroscopic element 29 is illustrated as being disposed in the electronics module 19 of FIG. 7E, this or similar elements could be disposed at other locations along the band (e.g., within the support 16 of the band) and/or multiple gyroscopic elements 29 could be disposed at various locations along the support 16.

Generally speaking, the embodiments of FIGS. 7C-7E include structure or elements, such as a touchscreen interface 26, pressure or magnetic sensors 27 or gyroscopic elements 29 that can be used to assist the electronics module 19 in determining the orientation or positioning of the wristband support 16 or the display 18 with respect to one or more fixed locations on a user's wrist when the device 10 is wrapped around the user's wrist. This operation enables the module 19 to then calibrate the display 18 to place or center display information such as display screens at particular locations with respect to the user's wrist, such as being centered on the top of the wrist, on the bottom of the wrist, on the inner side of the wrist, on the outer side of the wrist, etc. Likewise, these elements or sensors may be used to detect user inputs and band orientation or location.

Moreover, while FIGS. 1-7 illustrate magnetic based connection structures, other connection structures, such as one or more mechanical connectors (e.g., buckles, snap components, etc.), any desired hook and loop connection material, like Velcro, or some other connection means, etc. could be used instead of or in addition to any of the above-described magnetically coupled connection structures (not shown). In the embodiments in which the article 10 includes a connection structure that utilizes one or more mechanical connectors in combination with one any of the above-described magnetically coupled connection structures, the connection structure can provide both a magnetic connection and a mechanical connection, and, thus, the connection structure provides a stronger and more durable connection between the ends 14 of the article 10 or between the various portions of the band or support 16. In these cases, the magnetic connectors can, but need not, be disposed near or proximate to the mechanical connectors.

Figure 8A:
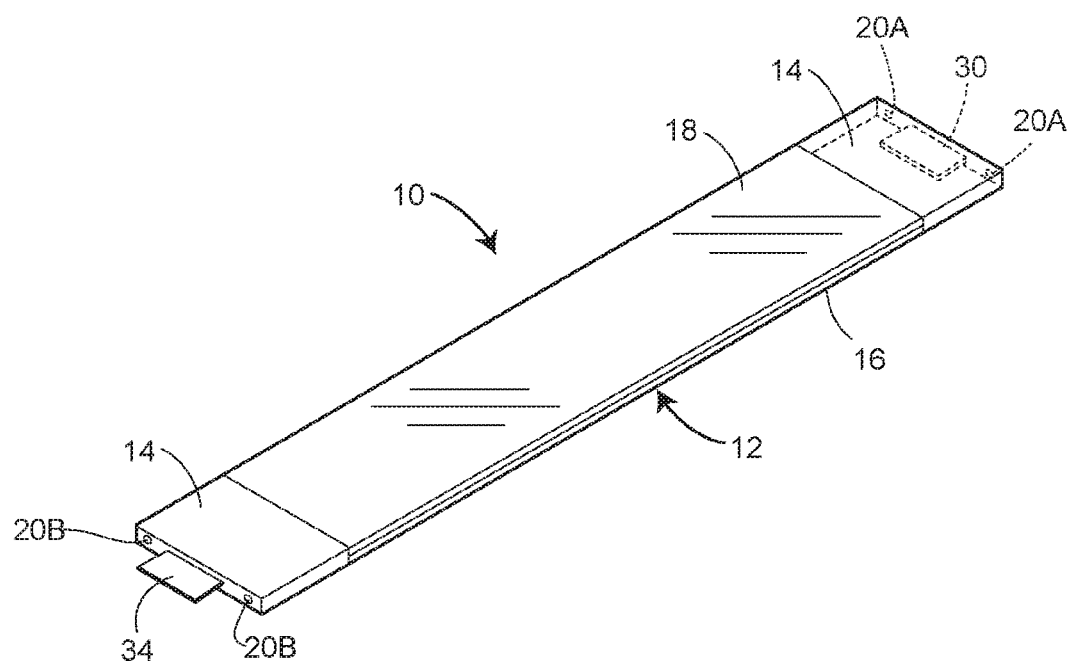
FIGS. 8A and 8B illustrate an example attachable article in the form of a wristband device having a flexible display and a connection structure that includes magnets and a tab and recess arrangement.
Figure 8B:
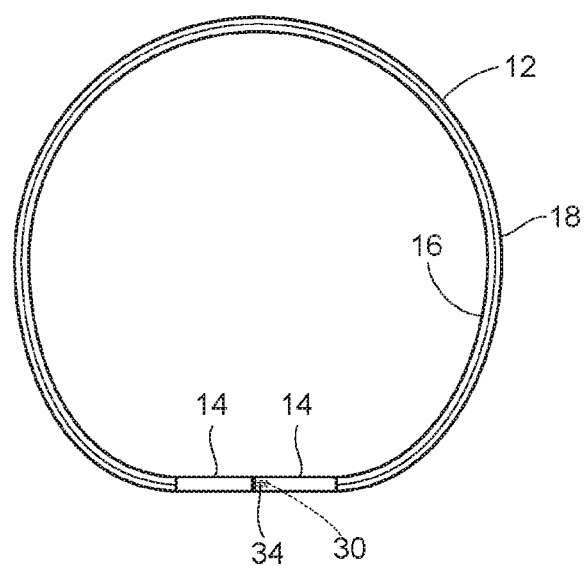

For example, FIGS. 8A and 8B illustrate a set of magnetic connectors used in conjunction with a mechanical connector to effect a clasping structure in a fixed length band. In the embodiment illustrated in FIG. 8A, the flexible attachable article 10, again illustrated in the form of a wristband, includes a similar band portion 12 and end pieces or clasps 14. However, in this embodiment, the article 10 has a connection structure that not only includes magnets 20A, and 20B disposed at the lateral ends of the band portion 12, as described above in connection with FIGS. 1 and 2, but also includes mechanical connectors that can effectuate a mechanical connection between the end pieces or clasps 14, such that the clasps 14 can be mechanically and magnetically connected to one another when the device 10 is bent, as illustrated in FIG. 8B, to form a circular or oval band. In FIGS. 8A and 8B, the mechanical connectors take the form of a recess 30 that is formed or defined in the longitudinal or lateral end of one of the clasps 14 and a tab 34 that is formed or defined on, and extends laterally outward from, the longitudinal or lateral end of the other one of the clasps 14. The tab 34 can be disposed or inserted into the recess 30 to mechanically connect the longitudinal ends of the opposing clasps 14 to one another when the flexible band 12 is bent to be disposed around or on a wrist, an arm, etc., for example. In an embodiment, the tab 34 and recess 30 connection may comprise a pair of magnets, e.g., one magnet that is included or disposed in the tab 34, and another magnet that is included or disposed in the recess 30 so that the tab 34 and the recess 30 themselves form a connection that is both mechanical and magnetic. At the same time, the magnets 20A and 20B, by virtue of being in proximity to one another as shown in FIG. 8B, create or provide a respective magnetic force that also serves to hold the clasps 14 together. In this manner, the connection structure described in connection with FIGS. 8A and 8B can provide a stronger, more durable connection when the clasps 14 are connected in an end-to-end arrangement so that the device 10 is clasped in a continuous circle or oval with a fixed or predetermined length. However, in some embodiments, the tab 34 and recess 30 mechanical (and optionally magnetic) connection may be the sole connecting mechanism to releasably attach the device or article to itself. That is, the tab 34 and recess 30 mechanical (and optionally magnetic) connectors may be utilized on a device or article 10 that does not include any other magnets 20A and/or 20B to releasably attach the device or article to itself.

In some instances, it may be desirable to adjust (e.g., expand, reduce) the length of the band 12 to accommodate or fit differently-sized mounting members (e.g., a leg instead of an arm). Accordingly, one or more extenders 40 can be removably coupled to one or both of the first and second ends 14A, 14B of the band 12 to adjust the length of the band 12 and/or to add or increase functionality to the device 10. It will be understood that any number of extenders 40 can be used, depending on the desired length of the band 12 and/or the desired functionality.

Figure 9A:
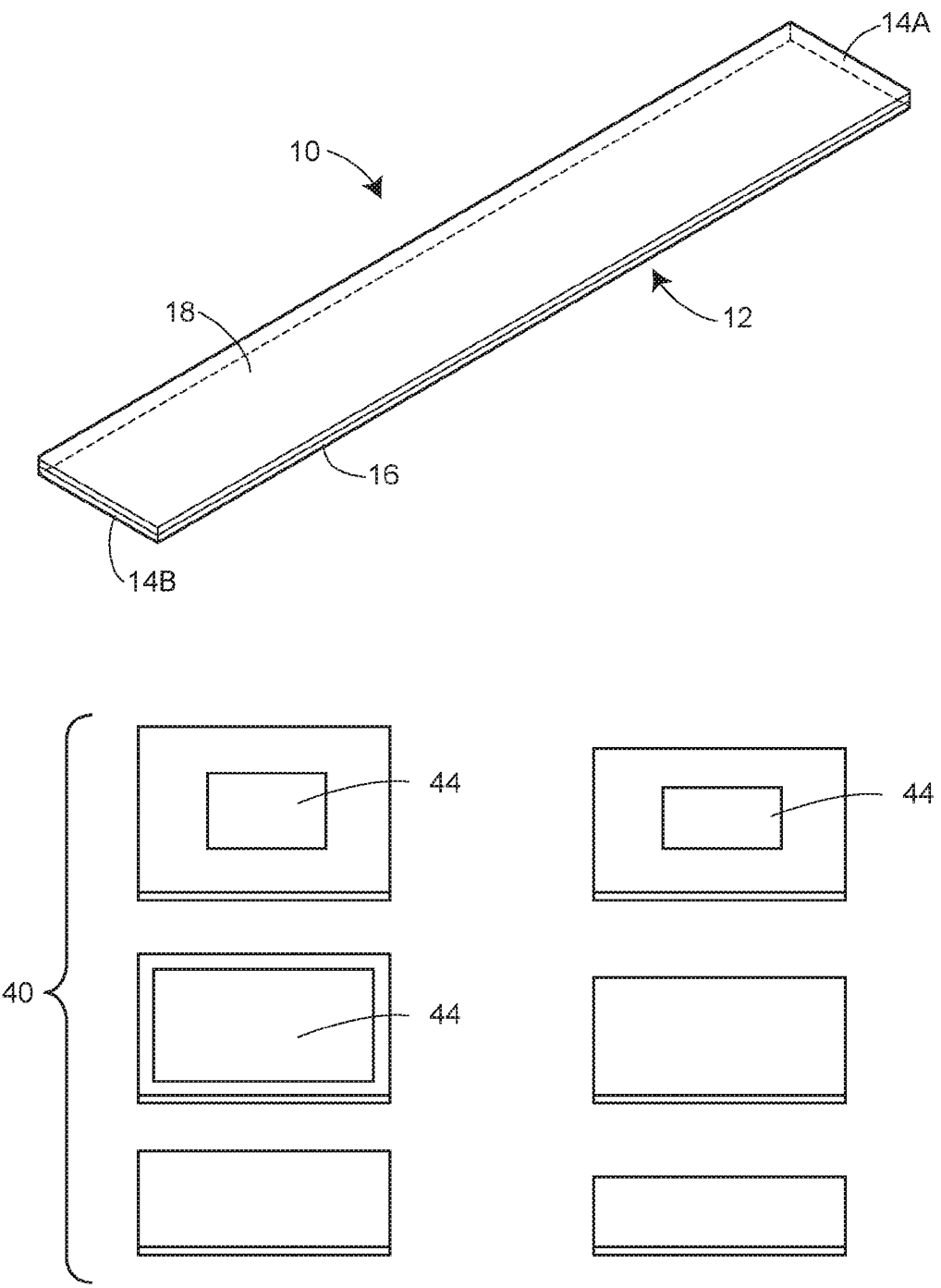
FIG. 9A illustrates a plurality of extenders that can be removably coupled to an attachable article to adjust a length of the attachable article.

FIG. 9A illustrates a number of different extenders 40 that can be removably coupled to one or both of the ends 14A, 14B of the band 12. The extenders 40 illustrated in FIG. 9A have the same shape but have slightly different sizes. In other examples, the extenders 40 can have different shapes (than one another and/or the extenders 40 in FIG. 9A) and/or different sizes (than one another and/or the extenders 40 in FIG. 9A). The extenders 40 can have the same radius of curvature or can have different radii of curvature, such that the device 10 can accommodate different radii of curvature due to different sized mounting members (e.g., different sized wrists). Likewise, the extenders 40 can have the same arc length or can have different arc lengths, such that the device 10 need not include an excessively large number of extenders to accommodate larger mounting members (e.g., larger wrists). The extenders 40 can be made of a same or different flexible material (e.g., cloth, leather, plastic), a same or different rigid or semi-rigid material (e.g., hard plastic, metal), or various combinations of different flexible, rigid, and semi-rigid materials. As an example, two extenders 40 can be made of a flexible material while two other extenders 40 can be made of a rigid or semi-rigid material.

Moreover, one or more of the extenders 40 can include a display 44. The display can be similar to the flexible display 18 of the device, while in other cases the display can be a different type of display. The display can be an extension of the flexible display 18 of the device 10, while in other cases the display can be a separate display, such as, for example, an indicator display or a matrix display that, for example, reacts to certain user interactions, reacts to certain users wearing the device 10, provides different content, or performs some other desired functionality. In this manner, the extenders 40 can provide additional display capability and/or area to the device 10.

Finally, while not illustrated in FIG. 9A, it will be appreciated that the one or more extenders 40 can include indicia, such as, for example, engravings, branding, badges, and artwork. The indicia can be added by a user of the device 10 (e.g., for self-expressive reasons) or can be added by the manufacturer (e.g., to identify an extender 40 as corresponding to a certain device 10).

As briefly noted above, the one or more extenders 40 can be removably coupled to one or both of the ends 14A, 14B of the band 12. In some cases, one or more extenders 40 can be removably coupled to only one of the ends 14A, 14B, while in other cases one or more extenders 40 can be removably coupled to each end 14A, 14B. In the event that two or more extenders 40 are utilized, these extenders 40 will also be removably coupled to one another. The extenders 40 can be removably coupled to one another in the same manner as the extenders 40 are coupled to one or both of the ends or can be removably coupled to one another in a different manner.

Figure 9B:
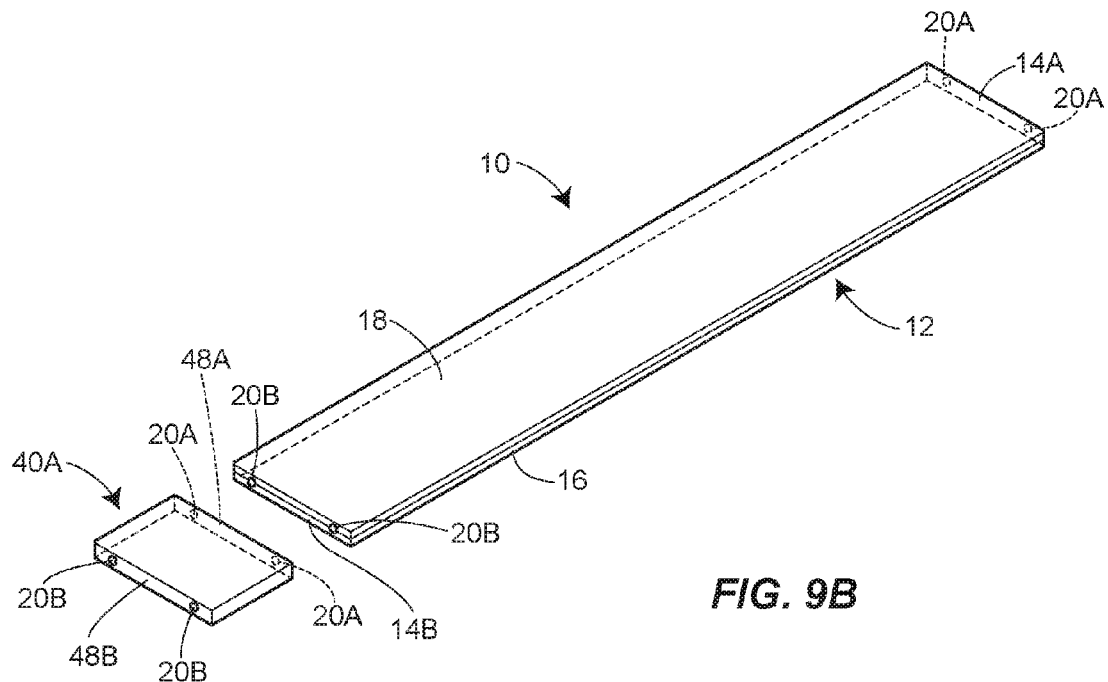
FIGS. 9B and 9C illustrate an example of an extender removably coupled to an attachable article in the form of a wristband device, via a magnetic connection, to adjust a length of the attachable article.

Generally speaking, it is envisioned that the one or more extenders 40 can be removably coupled to one or both of the ends 14A, 14B and to one another using a number of different connection techniques or methods. If desired, one or more of the extenders 40 can be removably coupled via a mechanical connection such as, for example, a tab and a recess arrangement with or without an integral magnetic mechanism, and or without a separate magnetic mechanism (e.g., similar to the tab and recess arrangement described above), In another embodiment, one or more of the extenders 40 can be removably coupled via a magnetic connection that is included in the extender itself, but not in a tab and recess. As illustrated in FIG. 9B, for example, magnets 20A and 20B can be disposed on the ends 14A and 14B, respectively, of the band 12 and magnets 20A and 20B can be disposed on respective ends 48A, 48B of an extender 40A. When, for example, the end 48A of the extender 40A is brought into close proximity with the end 14B of the band 12, the magnets 20A and 20B operate to connect the end 48A of the extender 40A to the end 14B of the band 12 of the device 10, thereby connecting the extender 40A to one end of the device 10.

Figure 9C:
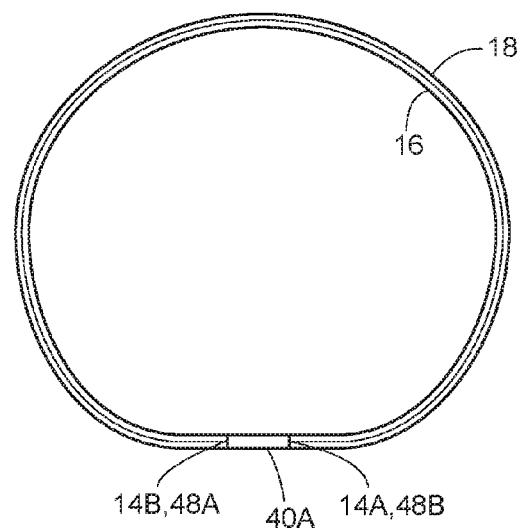

Whether the extended device utilizes a tab and recess mechanism and/or a magnetic mechanism, the extended device 10 can then be folded around on itself as illustrated in FIG. 9C and the end 48B of the extender 40A can be similarly connected, in an end-to-end manner, to the end 14A of the band 12. It will be appreciated that the device 10, by virtue of being extended by the extender 40A, will be longer and will therefore have a slightly different (e.g., slightly flatter or more oval) shape than the non-extended device 10 (see FIG. 9A) when in the folded position.

Of course, if desired, one or more of the extenders 40 (e.g., the extender 40A of FIGS. 9B and 9C) can be removed or detached from the device 10 in a similar manner as described herein. This might be done, for example, when it is desirable to reduce the length of the band 12 to accommodate or fit a smaller-sized mounting member (e.g., an arm instead of a leg), and/or when additional functionality provided by one or more of the extenders 40 is no longer necessary.

Figure 10:
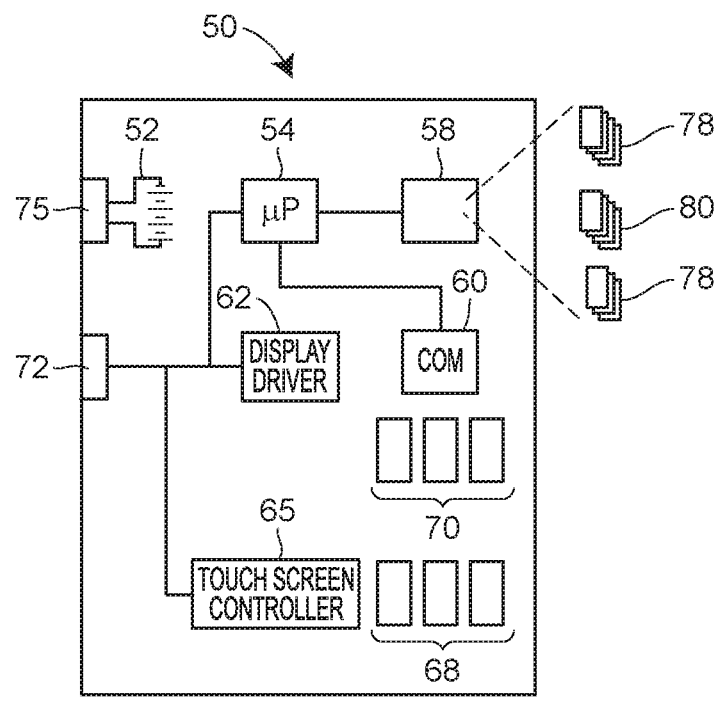
FIG. 10 is a block diagram of an electronics module associated with the attachable articles of FIGS. 1-9.

FIG. 10 illustrates a block diagram of various electronic components, referred to herein as an electronics suite 50, that may be used in or disposed in the electronics module 19 of any of the attachable articles described herein to drive the flexible display 18 of the dynamically flexible, attachable article or device 10. In particular, the electronics suite 50 illustrated in FIG. 10 includes a battery 52 that powers a number of other modules or electronic components including a microprocessor or other processor 54, a computer readable memory 58, which may be, for example, a flash memory or other suitable type of non-transitory, tangible, data storage medium, one or more communication modules 60, one or more display drivers 62, a touch screen controller 65 and a number of sensors 68 and other secondary devices 70. The sensors 68 may include, for example, an impact sensor or step counter, one or more gyroscopic sensors or gyroscopes, temperature sensors, vibration sensors, pulse rate monitors, pressure sensors, strain gauges, etc. For example, the sensors 68 may include any number of any number of types of sensors, such as strain gauges, gyroscopes, accelerometers, compression sensors, tensional strain sensors, positional sensors, motion or movement sensors, pressure sensors, vibration sensors, temperature sensors, orientation sensors, gravity sensors, light sensors, and piezoelectric sensors, to name a few. The secondary electronic devices 70 may include, for example, an alarm or noise creation device, a speaker, a microphone, one or more vibrational elements or vibrators, the operation of each of which causes an area on which the element is disposed (e.g., the clasp 14, a particular location of the band 12, or the electronics module 19) to vibrate, etc. Although FIG. 10 illustrates the sensors 68 and the secondary electronic devices 70 as being integral with the electronics suite 50, in some cases, one or more of the sensors 68 and/or the secondary electronic devices 70 are physically disposed at one or more other locations along the band 12 separate from the remainder of the electronics suite 50. In these cases, though, the separately disposed sensors 68 and/or secondary electronic devices 70 remain in communicative connection with the remainder of the electronics suite 50 (e.g., via a wired or wireless connection).

Similarly, although FIG. 10 illustrates the one or more display drivers 62 as being integral with the electronics suite 50, in some cases, the one or more display drivers 62 are physically disposed on the band 12 at one or more other location separate from the remainder of the electronics suite 50. In an example, the one or more display driver 62 is disposed in one or more locations that are proximate to the electrodes or connectors of the pixel elements of the flexible electronic display 18, e.g., on the backplane of the flexible display 18 or at some other suitable location. The separately located display drivers 62, though, remain in communicative connection with the remainder of the electronics suite 50 (e.g., via a wired or wireless connection).

As will be understood, the memory 58, the communication module 60, the display driver 62 and the touch screen controller 65, as well as the sensors 68 and other secondary electronic devices 70, are communicatively connected to the processor 54 and may operate to perform various functions in conjunction with applications or other programs implemented by the processor 54. Still further, each of these elements is connected to and is powered by the battery 52 in any known or desired manner. Still further, the electronics suite 50 of FIG. 10 may include one or more communication ports, such as communication port 72 (e.g., a USB or other type of digital communication port) and a power or battery charger input port 75. In this case, the power input port 75 may be connected to the battery 52 and enable charging or recharging of the battery 52 using any known or desired recharging circuitry and methodology. Alternatively or in addition, the communications input/output port or interface 72 (in the form of for example, a USB input port) may be connected to the battery 52 and provide power to the battery 52 for charging battery 52, and the input/output port or interface 72 may also be connected to the microprocessor 54, as well as to the communication circuit module 60, for performing wired- and/or wireless-based communications via the input port 72. Of course, the communication interface 72, while being illustrated as a USB-type connection, could any other type of known wired or physical communication connection, including any desired serial or parallel digital communication port using any number of pins or wires, as is known in the art, an analog communication port, etc. For example, the communication interface 72 may be a wireless input port for performing wireless communications. In some configurations, the device 10 includes multiple communication interfaces or ports 72 of multiple different types.

In an embodiment, the power input port 75 may be a wireless input port for powering the article 10, and in this case may, for example, be part of a battery charger unit that operates to charge the battery 52 using, for example, an inductively coupled charging technique. If the battery charger unit is part of an inductively coupled charging system, it generally responds to electromagnetic waves produced by an exterior charging unit (not shown) to charge the battery 52 when the attachable article 10 is disposed near the external charging unit. In another case, the battery charger of the input port 75 may be a kinetic energy charger unit that converts motion of the device 10 (such as that associated with movement of an arm when the attachable electronic device 10 is in the form of a wristband) into electrical energy which is provided to charge the battery 52.

As will be understood, the processor 54, which may be a programmable, general-purpose processor or a specially programmed processor programmed using any desired type of hardware or firmware programming, generally coordinates and implements the operation of the display 18 and the associated electronic components as described in more detail herein. The computer readable memory 58 stores various applications, including for example the general operating system implemented by the processor 54, and various applications (illustrated as a set of applications 78 in FIG. 10) to be run on the processor 54 to implement various different types of functionality via the device 10, some of which will be described in more detail herein. The memory 58 may also store one or more data files 80, which may be, for example, image or video data files associated with various images to be displayed on the display screen 18 at various different times. Still further, the memory 58 may store application data that may be created by the various applications 78 or the microprocessor 54 as part of the operation of various applications 78 and to be used by those applications 78 either during runtime of the applications 78 or at other times. If desired, the microprocessor 54 or one of the secondary electronic components 70 may include or be a clock that tracks the current time, day, date, month, year, time zone, etc.

As an example, one or more of the applications 78 may implement various functionalities typically associated with standard computers or other types of electronic devices such as personal handheld electronic devices, including for example an e-mail application, an Internet or web-browsing application, an alarm clock application, a calendar application, a music-playing application such as an MP3 application, a video application, a digital picture slideshow application, a mapping application, an e-reading application which may provide books, notes, magazines or other types of articles, for reading by the user, etc. Still further, one or more of the applications 78 may operate on the processor 54 to turn the display 18 associated with the dynamically flexible, attachable device 10 into a slave display device that may be tied to or communicably coupled to an exterior master device that is generating content to be displayed via the flexible display 18. The master device, which may be a smart phone or a nearby computer device, may be wirelessly connected to the electronics suite 50 to provide content to be displayed on the flexible display 18 and will typically have more memory, and computing and processing power than the processor 54.

The communication module 60 of FIG. 10 may include or use any type of communication hardware/software/firmware that uses any desired types of communication techniques to enable the microprocessor 54 to communicate with exterior devices or sources. Of course, the communication module 60 could include multiple different types of communication hardware/software/firmware, including any kind of hardwire-based communication module or wireless-based communication module. As examples, the communication module 60 may be a wired or wireless Internet-based communication module that may provide wired or wireless-based, IP protocol communications (e.g., via one or more communication interface ports 54) between the dynamically flexible, attachable article or device 10 and other devices or a communication network such as a LAN or a WAN to which other devices are communicatively connected. Likewise, the communication module 60 may include a near field communications (NFC) module, a radio frequency identification (RFID) communications module for communicating with, sending messages to and/or receiving messages from RFID tags stored in other devices around or close to the device 10. In this case, the communications module 60 may decode signals received from RFID tags in response to pings by the RFID communication module 60 to identify the RFID tags or tag numbers (identifiers) associated with these devices. Likewise, the communication module 60 may be a near field communication (NFC) module or a Bluetooth communication module, which may perform near field communications or Bluetooth communications in any known or desired manner with nearby NFC or Bluetooth enabled devices, thereby enabling wireless communication between the device 10 and other closely situated or closely located electronic devices, e.g., via a wireless communication interface 72. Still further, the communications module 60 may include a USB or other type of wired communication module for decoding and encoding USB-based communication signals to be sent out and received via a USB communication port 72.

As illustrated in FIG. 10, the display driver 62 is coupled to the microprocessor 54 and to the display 18, and drives the display 18 to present different images to a user and thus implement functionality via the display 18. The display driver 62 may be associated with or use any type of display driver technology associated with the various different types of flexible displays that might be used, including, for example, e-ink or other bi-stable display drivers, organic light emitting diode (OLED) display drivers, etc. Of course, it will be understood that the display driver 62 is connected to the various pixel elements or pixels of the flexible display 18 to cause the pixel elements to change their visual appearance so as to present content image on the flexible display 18. Typically, but not necessarily, each pixel element is communicatively connected to two electrodes, lead lines, connecting lines, or connectors corresponding the (x, y) coordinates of the particular pixel element on the flexible display 18. Thus, the display driver 62 provides image content (e.g., by using electrical signals or other suitable signals) to a set of connecting lines corresponding to a width of the flexible display 18 or its display area (and, in some cases, physically emanating from a width edge or transverse side of the flexible display 18 to the driver 62), and the same display driver 62 may provide image content (e.g., by using electrical signals or other suitable signals) to another set of connecting lines corresponding to a length of the flexible display 18 (and, in some cases, physically emanating from a length edge or longitudinal side of the flexible display 18 to connect to the driver 62). In an example, the display driver 62 provides image content to a set of transverse connecting lines and/or to a set of longitudinal connecting lines so that image content is presented on the display area of the flexible display. In an example, the article 10 includes multiple display drivers 62, each of which provides image content to a respective set of connecting lines.

Returning to FIG. 10, the display driver 62 illuminates or causes the pixel elements to obtain or reach a color, a lighting level, an on-off state, etc., so as to drive the display 18 to present various images and other functionality as determined by the particular application 78 being executed on the microprocessor 54. In some cases, the display driver 62 may cause various images, such as one or more artistic renditions, patterns, etc. or other types of images stored in the memory 58 to be displayed as one of the images 62 on the flexible display 18. Such an image may be any type of graphic element in the form of artwork, an indication of an association of the user with a particular university or other organization, such as a logo, a mascot, an icon, etc. In the case of a static display, and particularly when the flexible display 18 is a bi-stable type of flexible display, such as an e-ink type of display, the display 18 might display a particular image or background image whenever the device 10 is in a sleep mode, and thus in which the display driver 62 is not operating to actively drive the display 18.

Of course, the touch screen controller 65 is connected to a touch screen interface 26, if such an interface exists, and receives input signals from the touch screen interface 26. The controller 65 operates to decode these input signals to identify touch events that occur with respect to the touch screen interface 26. The touch screen interface 26 may be a capacitive touch screen interface or any other suitable type of touch screen interface disposed over the flexible display 18, and may be transparent in nature to thus enable the pixel elements of the display 18 to be viewable through the touch screen interface 26. Of course, other types of touch screen interfaces may be used instead or as well. In any event, the touch screen controller 65 operates to energize and control the touch screen interface 26, as well as to recognize and decode touch screen events to identify, for example, the location of each touch screen event, a type of a touch screen event, such as a tap or a swipe movement, etc. If desired, the touch screen controller 65 alone or in conjunction with the processor 54 may operate to determine or recognize gestures that are input via the touch screen interface 26, such gestures being, for example, a slide, a swipe, a multi-finger pinch or any other type of gesture that includes one or more finger movements coordinated with one another. Each such gesture may indicate an action to be taken on or via the device 10. Of course, the dynamically flexible, attachable article or device 10 may include other or different types of user input devices configured to detect user-generated gestures, such as interfaces that include buttons switches, roller balls, slide bars, pressure sensors, strain gauges, etc., disposed on, for example, one of the clasps 14 or elsewhere along the band 12. Such user interfaces may enable the user to perform more rudimentary functions, such as scrolling movements, on-off powering movements, mode switching, etc. that are traditionally entered via actuate-able buttons or switches.

As previously discussed, the sensors 68 may include any of various different types of sensors. In an embodiment, the sensors 68 include one or more gyroscopes which detect movement of or the orientation of the band 12, rapid shaking of the band 12, etc. One or more of these types of movements may be considered to be a particular type of input or user input, such as a gesture to reset the device 10, to change a mode of the device 10, etc. Likewise, the output of such gyroscopes can be used by the microprocessor 54 to determine the orientation or direction of the flexible display 18 to enable the microprocessor 54, or an application 78 executed on the microprocessor 54, to determine the proper orientation of the image to be displayed on the flexible display 18. In some instances, such motion detection and position detection devices might be located in two or more of the fasteners 14 or other electronics modules 19, to enable the device 10 to more accurately determine whether the device 10 is oriented around a wrist or other circular member or whether it is instead laid out flat or oriented in some other manner. The microprocessor 54 or an application executed thereon may change functionality, behavior, and/or actions of the device 10 based on the detected orientation of the band 12.

Likewise, the sensors 68 may include step-counter or an impact-sensor like and accelerometer, which might be used to count the number of steps a user takes over a particular period time. Alternatively or in addition, the sensors 68 may include one or more temperature sensors, which may detect the ambient temperature, the temperature of the skin of the user when the device 10 is being worn, etc. The sensors 68 could also include a blood-pressure sensor device, which might check blood pressure or heart rate using known exterior blood-pressure sensor device technology.

In some cases, the sensors 68 include one or more pressure or force sensors and/or strain gauges which detect pressure, strain, or similar forces that are considered to be an input to cause the functionality, behavior, and/or actions of the device 10 to change, e.g., reset the device 10, change a mode of the device 10, change a presentation displayed on the flexible display 18 of the device 10, etc. In one example, two pressure or force sensors are positioned on or attached to the band 12 (e.g., as part of the backplane of the flexible 18 or as part of the support 16 so that when the dynamically flexible device 10 is attached to itself in a generally circular or looped configuration, the pressure or force sensors are diametrically opposed to each other. In other examples, multiple pressure or force sensors may be disposed along the band of the device 10 at desired locations.

As will be understood, the various different electronic devices or components disposed in or shown in the electronic suite 50 of FIG. 10 may be used in conjunction with one another in various different manners to provide a whole host of functionality for the attachable article 10, which might be beneficial in various different uses of that article. However, only some of these uses will be described in detail herein.

Figure 11A:
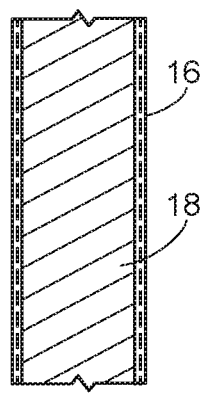
FIGS. 11A-11B illustrate a top and a cross-sectional view of a flexible wristband device having structure that protects the edges of a flexible display disposed thereon.
Figure 11B:
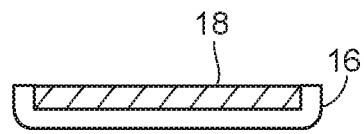
Figure 12:
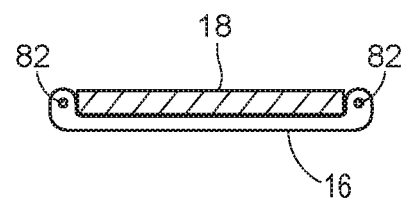
FIG. 12 illustrates a cross-sectional view of a flexible wristband device illustrating further side protection structure for protecting the edges of a flexible display.

It may be important to limit in the manner in which the flexible substrate 16 can bend or flex so as to protect the flexible display 18 and/or the touch screen interface 26 of FIGS. 1-9, as well as to provide or protect the edges of those devices, which might be subject to impact if the wristband 10 is hit from a lateral side. FIG. 11A illustrates a top view of the flexible substrate 16, showing the flexible display 18 disposed thereon. In this case, the flexible display 18 is disposed on top of the flexible substrate 16 over the center portion of the substrate 16, while the edges of the substrate 16 extend out transversely towards the sides of the wristband 10 beyond the flexible display 18 at least a little bit. This additional area of material of the substrate 16 may be used to protect the flexible display 18 from being bent or torn in the case of a side impact to the wristband 10, as this material will operate to blunt or absorb some of that impact. As illustrated in FIG. 11B, which provides a cross-sectional view of the wristband of FIG. 11A, the flexible substrate 16 can be thicker in the area at the edges of the band 10 and may extend upward to be even with or disposed above the lateral or transverse sides of the flexible display 18, to provide additional side impact protection for the flexible display 18. In this case, as illustrated in FIG. 11B, the display 18 is seated in a space or crevice formed within the center of the substrate 16, wherein the substrate 16 has sidewalls that extend above or up against the edges of the flexible display 18, in order to provide side impact protection to the display 18. In some cases, the edge or sidewalls of the substrate 16 that extend upward to protect the edges of the flexible display 18 and/or the touch screen interface 26 (if present) may be formed with stitching when the substrate 16 is made of leather for example. In another embodiment, illustrated in FIG. 16, additional side impact protection is provide by a wire or other harder, rigid or semi-rigid material 82 (having a density greater than that of the flexible substrate material 16) but that is still flexible, disposed within or along the flexible substrate 16 along the edges of the flexible display 18 near or adjacent to the sides of the flexible display 18. As illustrated in FIG. 12, the wires 82 are provided within the flexible substrate material 16 and extend along the edge of the band portion 12 next to or adjacent the transverse sides of the flexible display 18 to provide superior support or edge protection for the display 18 in the case of a side impact to the wristband 10. Of course, other types of edge protections besides those illustrated in FIGS. 11A, 11B, and 12 can be used to protect the edges of the of the flexible display 18.

FIGS. 13A-D illustrate structure that can be used to protect the flexible display 18 and the touch screen interface 26 (if it exists) by limiting the certain flexing, bending and/or torsional movement of the flexible substrate 16, and thus the display 18 disposed thereon, to certain predefined bending motions or ranges. In particular, because the flexible display 18 is formed as a set of separate substrates having different electronic components formed or etched thereon, as will be described herein, certain types of movement or bending motions may cause damage to the flexible display 18 by causing these layers to delaminate or come apart from one another. In particular, while it is generally possible to flex or bend the band portion 12 in one direction (e.g. around a wrist to form a circular band such as that shown in FIGS. 2, 4, 8B and 9C) without delaminating the separate layers of the flexible display 18, it is typically not generally desirable or possible to be able to flex or bend the display 18 in the opposite direction or in multiple different directions, such as forming a circular band with the flexible display 18 facing the inside of the band, as doing may cause the layers of the flexible display to delaminate from one other and thus stop functioning.

More particularly, while it is desirable to bend the flexible substrate 16, as illustrated in FIGS. 2, 4, 8B and 9C, such that the display 18 faces towards the outside of a circular ring, it would be disadvantageous and potentially destructive to the flexible display 18 to bend the wristband 10 in too far in the opposite manner (referred to herein as a counter-rotational direction) with the display 18 on the inside of the ring, because to do so would or could potentially delaminate the various layers of the flexible display 18 from one another. Still further, it would be undesirable to provide too much flexing of the sides of the flexible display 18 around the longitudinal axis of the band 12 or too much torsional bending on the flexible display 18, wherein such torsional bending rotates one of the clasps 14 around the longitudinal center line of the band 12 with respect to the other of the clasps 14, thus forming a helical structure in the band 12. In this case, torsional rotation would occur when one end of the flexible display 18 is rotated in one direction while the other end of the flexible display 18 is rotated in the other direction, such as by rotating one of the end pieces 14 about the center longitudinal axis of the band 12 in a clockwise direction while simultaneously rotating the other end piece 14 about the center longitudinal axis of the band 12 in a counter-clockwise direction simultaneously. Again, as will be understood, too much of such a bending movement could delaminate the flexible display 18 and/or otherwise damage the flexible display 18.

Figure 13A:
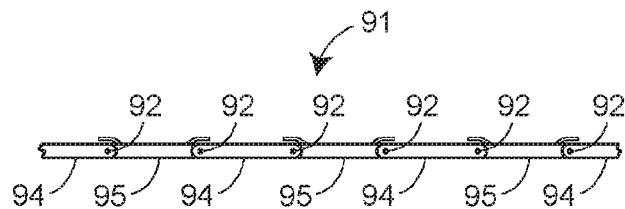
FIGS. 13A and 13B illustrate side views of various bending limiting members that limit the flexing motion of a flexible substrate in at least one direction while allowing flexing motion in another or opposite direction.
Figure 13B:
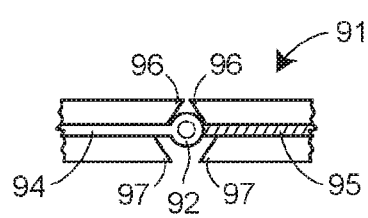

FIGS. 13A-D illustrate various mechanisms for limiting the bending or flexing motion of the flexible substrate 16 of the wristband 10 to the desired bending motions like those illustrated in FIGS. 2, 4, 7, 8 and 9, while limiting undesirable bending motion such as longitudinal flexing, torsional or counter-rotational flexing of the display 18. In particular, to limit the counter rotational bending motion of the band 12, i.e., a bending motion that would put the flexible display 18 on the inside of a circular band as opposed to the outside of the circular band as illustrated in FIGS. 2 and 4, a longitudinally spaced rigid or semi-rigid member can be disposed in or on the flexible substrate 16 that operates to allow bending motion as illustrated in FIGS. 2 and 4 but to limit counter-rotational bending movement. FIGS. 13A and 13B illustrate a bending limiting member 91 configured as a set of interconnected slats or bars rotatable with respect to one another around a pivot point 92. In FIG. 13A, the interconnected slats or bars have alternating flat members 94 and flat members 95 with wings on the edges thereof, wherein the wings are disposed above the adjacent flat members 94. The flat members 94 are pivotally connected to the flat members 95 so that the wings, when disposed above a flat member 94, prevent or at least limit rotation about the pivot point 92 in one direction while allowing such rotation in the opposite direction. In FIG. 13B, interconnected bars 94 and 95 are connected at pivot points 92 and each includes a protrusion 96 that extends at least partially above the pivot point 92. In this case, the protrusions of adjacent bars 94 and 95 contact each other very soon (in response to minimal rotation about the pivot point 92) when rotated in one direction, to thereby limit or prevent such rotation, and allow rotation in the opposite direction. Moreover, the interconnected bars 94 and 95 may additionally include protrusions 97 that extend below the pivot point 92 but that are spaced further apart and thus allow more rotation than the protrusions 96. The protrusions 97 will thus enable the member 91 to bend in one direction (i.e., the down direction in FIG. 13B) more than in the other direction (i.e., the up direction in FIG. 13B). However, the protrusions 97 will still prevent bending or flexing at large angles of curvature. The spacing and size of the protrusions 96 and 97 can be adjusted to obtain the desired amount of flexing in each direction.

Figure 13C:
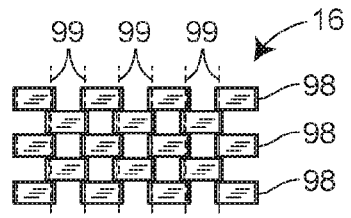
FIG. 13C illustrates a top view of a bending or flexing limiting structure forming a flexible substrate, formed as a series of transversely interconnected longitudinal members, each longitudinal member made up of a set of longitudinally disposed links.

Still further, FIG. 13C illustrates a top view of a bending or flexing limiting structure forming a flexible substrate, formed as a series of transversely interconnected longitudinal members 98, each longitudinal member made up of a set of longitudinally disposed links. Here, the various sets of rotatably interconnected links are rotatably interconnected by pivot members disposed along the dotted lines 99 of FIG. 13C. The various sets of links as illustrated in FIG. 13C may be used as or may be part of the flexible substrate 16, and may operate to limit the bending motion of the flexible substrate 16 in each of the longitudinal, counter-rotational and torsional directions described above. Of course, the interconnected links illustrated in FIG. 13C could additionally have wing or protrusion structure such as that of FIGS. 13A and 13B, or other structure that limits rotation of adjacent links about the transverse pivot points 99 interconnecting the links, to provide superior bending or flexing limiting structure.

Figure 13D:
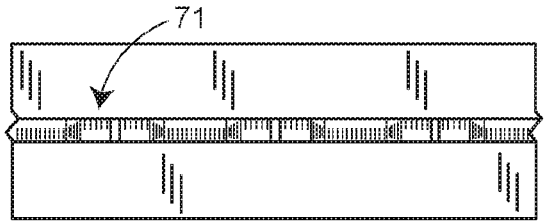
FIG. 13D illustrates a top view of a flexible substrate of a wristband device having bending limiting structure of any of FIGS. 13A-13C disposed therein.

In any event, the configuration of the members 91 of FIGS. 13A, 13B and 13C allow or enable movement of the adjacent slats or flat members 94, 95 and 98 with respect to one another in one direction, e.g., the down direction in FIGS. 13A and 13B, while limiting the rotational movement of the slats or bars 94 and 95 in the opposite direction, such as the up direction in FIGS. 13A and 13B. In this case, the member 91 with the alternating flat members 94 and flat members 95 or the interconnected substrate of FIG. 13C may be disposed along a longitudinal axis or in the longitudinal direction of the substrate 16, as illustrated in FIG. 13D, to allow the bending motion illustrated in FIGS. 2, 4, 8B and 9C while limiting counter rotational bending motion. While only one member 91 is illustrated in FIG. 13D as being disposed longitudinally in the center of the flexible substrate 16, more such members could be disposed at other locations along the length of the flat substrate 16, such as on either or both lateral sides of the substrate 16. Moreover, while only one member 91 is illustrated in FIG. 13D, multiple such members could be used to limit the counter-rotational movement of the flexible substrate 16. Of course, if desired, a bending limiting member similar to that of FIGS. 13A and 13B could be disposed along the edge of the flexible substrate 16 instead of or in addition to the wire 82 of FIG. 12, so as to both protect the edge of the flexible display 18 (by providing a rigid or semi-rigid structure at the edges of the display 18) and to limit the counter-rotational movement of the flexible substrate 16, while allowing rotational movement of the substrate 16 in the manners described herein. Thus, for example, in FIG. 12, the wire 82 could be replaced with a series of links forming a bar member 91 in accordance with the principles of FIG. 13A or 13B, wherein the links 74 and 75 are rotationally connected to one another and are disposed such that they allow rotation or movement in one direction while not allowing or at least limiting movement relative to one another in the other direction.

In a general sense, the support 16 of any or all of the articles described herein may take any number of different forms. The support 16 of any or all of the articles may take the form or include any of the bending limiting structures discussed above in connection with FIGS. 13A-13D. The support 16 of any or all of the articles may alternatively take the form of, or include any features of, any of the supports described in (1) U.S. Provisional Application No. 61/946,412, entitled "Support Structure for a Flexible Electronic Component," and filed Feb. 28, 2014, (2) U.S. Provisional Application No. 62/095,231, entitled "Support Structures for a Flexible Electronic Component," and filed Dec. 22, 2014, (3) U.S. Provisional Application No. 61/979,668, entitled "Support Structure for a Flexible Electronic Component," and filed Apr. 15, 2014, (4) U.S. Provisional Application No. 62/003,549, entitled "Flexible Electronic Component Movably Coupled to a Flexible Support," and filed May 28, 2014, (5) U.S. Provisional Application No. 62/006,714, entitled "Attachable, Two-Dimensional Flexible Electronic Device," and filed Jun. 2, 2014, and (6) U.S. Provisional Application No. 62/089,115, entitled "Support Structures for an Attachable, Two-Dimensional Flexible Electronic Device," and filed Dec. 8, 2014." The entire disclosure of each of these applications is hereby expressly incorporated by reference herein for all uses and purposes.

In a general sense, the flexible display 18 of any or all of the embodiments described herein may be manufactured as any type of flexible display, such as an e-paper display, an organic light emitting diode (OLED) display, etc. and this flexible display, once manufactured, may then be formed, curved or bent in various manners. Generally speaking, flexible display 18 may be made of two flexible substrates including a backplane flexible substrate and frontplane flexible substrate placed back to back, next to one another, or laminated onto each other. In the case of e-paper, an additional layer of material such as an adhesive may be included in the frontplane and disposed between the backplane and the frontplane. In some cases, such as with the use of active-matrix OLEDs, electrophoretic displays (EPDs), e-paper, electronic ink displays, e-reader displays, liquid-crystal displays (LCDs), or other active-matrix type displays, the backplane includes a plurality of semiconductor devices or elements, e.g., an array of transistors and/or other elements, disposed thereon for driving or providing energization to individual lighting, transmitting, or reflective elements disposed in a similar array on the frontplane or on top of the transistors and/or other elements. The semiconductor devices or elements may be formed on the backplane in any known or desired manner, such as by etching, dye cut forming, printing, sputtering, spin-coating, spray coating, other deposition or patterning techniques, or combinations thereof, etc. Likewise, the light emitting, transmitting, or reflective elements may be formed as any desired types of light emitting, transmitting, or reflective elements using these same or different techniques, and the elements may include light emitting diodes (LEDs), OLEDs, e-paper, liquid crystal, etc. In the case of e-paper, for example, the frontplane and the backplane may be formed with black and white, oppositely charged particles suspended in a clear fluid which, when put in an electric field, will cause the black or the white particles to drift to the top of the display to create a white state, a black state, or an intermediate grey state. In any case, the substrate of the backplane and the frontplane may be formed of the same material or of a different flexible material, such as plastic or flexible glass, and these materials may have the same or different flexibility properties, as long as both materials are able to flex to the curvature needed for bending the electronic display 18.

More particularly, the flexible displays illustrated herein, may be manufactured as a flexible display, such as an e-paper display, an organic light emitting diode (OLED) display, etc. Generally speaking, the flexible displays may be constructed on two flexible substrates, or may be constructed on one flexible substrate but having at least two flexible substrates. The flexible substrates may include a backplane display area and frontplane display area placed back to back, next to one another, or laminated onto each other. The frontplane display area comprises an array of optic elements (e.g., electro-optic elements) provided on a first flexible substrate that are capable of displaying an image, while the backplane display area comprises an array of semiconductor devices or elements (e.g., transistor elements) provided on a second flexible substrate for driving or providing energization to the optic elements on the frontplane. Materials suitable for use as the flexible substrate for either the frontplane and/or the backplane include, but are not limited to, various plastic substrates such as polyimide, polyethylene terephthalate (PET), polycarbonate, polyethersulfone, polyether ether ketone (PEEK), and polyethylene naphthalate (PEN). Metallic foils or flexible glass also may be used.

Preferably, the backplane display area comprises an array of thin film transistors (TFTs) provided on a flexible, plastic substrate such as PET. The TFT array may include switching and/or driving TFTs, and additional elements such as storage capacitors, and interconnect wiring. An individual TFT element generally is made by successive deposition and patterning of conductor (i.e., source, drain, and gate electrodes), insulator (i.e., dielectric) and semiconductor thin film layers. The active semiconductor layer can be composed of either organic (small-molecule or polymeric semiconductors) or inorganic materials (such as amorphous silicon, low-temperature polycrystalline silicon, graphene, carbon nanotube, and metal oxide semiconductors).

The TFT array may preferably comprise organic TFTs (OTFTs) based upon an organic semiconductor described in at least one of U.S. Pat. No. 6,585,914; U.S. Pat. No. 6,608,323; U.S. Pat. No. 6,991,749; U.S. Pat. No. 7,374,702; U.S. Pat. No. 7,528,176; U.S. Pat. No. 7,569,693; U.S. Pat. No. 7,605,225; U.S. Pat. No. 7,671,202; U.S. Pat. No. 7,816,480; U.S. Pat. No. 7,842,198; U.S. Pat. No. 7,892,454; U.S. Pat. No. 7,893,265; U.S. Pat. No. 7,902,363; U.S. Pat. No. 7,947,837; U.S. Pat. No. 7,982,039; U.S. Pat. No. 8,022,214; U.S. Pat. No. 8,329,855; U.S. Pat. No. 8,404,844; U.S. Pat. No. 8,440,828; U.S. Patent Publication No. 2010/0252112; U.S. Patent Publication No. 2010/0283047; U.S. Patent Publication No. 2010/0326527; U.S. Patent Publication No. 2011/0120558; U.S. Patent Publication No. 2011/0136333; and U.S. Patent Publication No. 2013/0062598, the disclosure of each of which is incorporated by reference herein in its entirety for all purposes. While OTFTs may include metallic contacts and a dielectric layer composed of silicon oxide ($SiO_2$) or another inorganic oxide or nitride (such as $Al_2O_3$, $HfO_2$, $SiO_2$, or $Si_3N_4$), a dielectric layer composed of an electrically insulating polymer may be preferred. Exemplary polymeric dielectric materials include polyacrylates, polyimides, polyvinyl alcohol, polystyrene, polyester, polycarbonate, polyhaloethylene, epoxy resins, siloxane polymers, benzocyclobutene-based polymers. Other polymeric dielectrics are described in U.S. Pat. No. 7,605,394; U.S. Pat. No. 7,981,989; U.S. Pat. No. 8,093,588; U.S. Pat. No. 8,274,075; U.S. Pat. No. 8,338,555; U.S. Patent Publication No. 2011/0175089; U.S. Patent Publication No. 2011/0215334; and U.S. Patent Publication No. 2012/0068314. Conductive polymers such as poly(3,4-ethylenedioxythiophene) poly(styrenesulfonate) (PEDOT:PSS) may be used as alternative materials for metallic contacts in OTFTs.

Preferably, the TFT array may comprise metal oxide TFTs based upon a metal oxide semiconductor. For example, the metal oxide semiconductor can be selected from various mixed oxides including one or more of indium, zinc, tin, and gallium such as indium zinc oxide (IZO), zinc tin oxide (ZTO), indium gallium oxide (IGO), and indium gallium zinc oxide (IGZO). In a more preferred embodiment, the TFT array may comprise IGZO TFTs. While state-of-the art IGZO TFTs usually include thick layers of inorganic materials such as $SiO_2$, $SiO_x$, $Si_3N_4$, and $SiO_xN_y$ as dielectric and passivation layers, it is preferred that if the TFT array backplane comprises metal oxide TFTs, organic materials are used in at least some of the dielectric and passivation layers, such that the thickness of the remaining inorganic layer(s) may be reduced to allow maximum flexibility of the TFT array as whole. Metal oxide TFTs incorporating one or more organic layers are described in U.S. Pat. No. 8,017,458; U.S. Pat. No. 8,097,877; U.S. Pat. No. 8,395,150; and U.S. Patent Publication No. 2012/0223314, the disclosure of each of which is incorporated by reference herein in its entirety for all purposes.

In some scenarios, such as for an electrophoretic or e-reader display, the frontplane display area may be laminated, sealed to, or otherwise secured onto the backplane display area. The frontplane display area may be produced by forming a subassembly that comprises, in sequence, a flexible substrate, a conductive electrode layer, an electro-optic layer, and optionally, an adhesive layer to allow lamination to the backplane. In the case of an OLED display, the electro-optic layer is sandwiched between two electrode layers and is typically built on the TFT array. Generally, at least one of the two electrode layers is transparent, often composed of a transparent conductive oxide such as indium tin oxide (ITO). The electro-optic layer is composed of an organic material capable of emitting light when a voltage is applied across the two electrode layers. The organic light-emitting material may have a stacked structure including a plurality of different organic layers. In addition to one or more emissive layers, the stacked structure may include additional layers such as a hole-injection layer, a hole-transport layer, an electron-transport layer, a hole-blocking layer, and/or an electron-blocking layer to enhance device performance. Individual OLED elements may have different emitters (for example, a red emitter, a green emitter, or a blue emitter) in their emissive layer to provide a colored image. Exemplary OLED device structures and materials are described in U.S. Pat. Nos. 5,707,745, 5,844,363, 6,097,147, 6,303,238, and 8,334,545, the disclosure of each of which is incorporated by reference herein in its entirety for all purposes.

In the case of an e-paper display, the electro-optic layer may be composed of an encapsulated electrophoretic medium. The encapsulated electrophoretic medium generally comprises numerous small capsules, each of which itself comprises an internal phase containing electrophoretically-mobile (e.g., black and/or white) particles suspended in a liquid suspending medium, and a capsule wall surrounding the internal phase. Typically, the capsules are themselves held within a polymeric binder to form a coherent layer positioned between two electrode layers. Most commonly, one electrode layer has the form of a single continuous electrode, while the other electrode layer is patterned into a matrix of pixel electrodes, each of which defines one pixel of the display. Electronic charges are applied to the capsules to bring particles of a selected color to the surface. Electrophoretic media and related display device structures are described in, for example, U.S. Pat. No. 5,930,026; U.S. Pat. No. 6,831,769; U.S. Pat. No. 6,839,158; and U.S. Pat. No. 7,170,670, the disclosure of each of which is incorporated by reference herein in its entirety for all purposes. In addition to electrophoretic displays, other e-paper display technologies include electrowetting displays, and electrofluidic displays as described in, for example, U.S. Pat. No. 7,446,945 and U.S. Pat. No. 8,111,465, the disclosure of each of which is incorporated by reference herein in its entirety for all purposes.

To integrate the TFT array backplane with the frontplane for a completed display system, the bottom or pixel electrode of the frontplane is (connected) to the drain or source electrode of the switching TFT in an e-paper display, and the driving TFT in an active matrix OLED (AMOLED) display.

Various organic layers on either the frontplane and/or the backplane may be formed on the flexible substrate by solution-phase deposition techniques such as spin-coating, slot coating, die coating, printing (e.g., inkjet printing, screen printing, pad printing, offset printing, gravure printing, flexographic printing, lithographic printing, mass-printing and the like), spray coating, electrospray coating, drop casting, dip coating, and blade coating. Inorganic (e.g., metallic or metal oxide) layers usually are deposited by physical or chemical vapor deposition methods (e.g., sputtering), but may be solution-processed if a soluble precursor is available. The layers may be patterned into specific elements by photolithography, either by use of the intrinsic photosensitivity of the layers (e.g., certain polymeric layers) or by use of a photoresist (e.g., metallic, metal oxide, or small-molecule organic layers).

Figure 14:
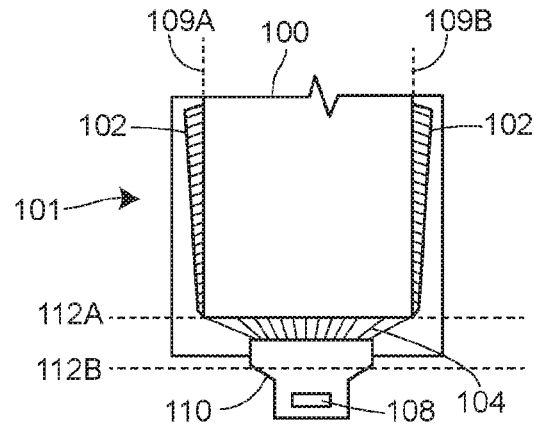
FIG. 14 illustrates a top view of a backplane layer of flexible electronic display as formed on a flexible display element substrate.

Moreover, it may be desirable to manufacture the flexible display 18 in a manner that maximizes the amount of the display area space viewable on the top layer of the device 10, i.e., that is viewable on the band 12. In this regard, FIG. 14 illustrates a base or backplane layer 101 of a flexible display 18 as manufactured. Generally speaking, the backplane of a flexible display 18 comprises a flat surface, or a first display substrate, and has a display area with various electrically energizing elements (e.g., transistors) formed, printed, etched or otherwise disposed thereon. As is known, the electronically energizing components on the backplane substrate of a backplane component are then operatively connected to electronically energizable components, such as organic light emitting diodes (OLEDs), encapsulated electrophoretic media (e.g., as in an e-paper display), etc., disposed on or formed on a frontplane component. Both the backplane substrate of the backplane component and the frontplane substrate of the frontplane component are flexible, and the backplane substrate and the frontplane substrate are aligned to provide a register between various energizing components and energizable components to thereby form pixels on the display area. In particular, the flexible display may be made of two or more layers including a backplane display substrate on which various display elements, such as pixel elements, associated with each pixel of the display are printed, etched or otherwise manufactured in the form of, for example, transistors or other switching elements, a secondary or frontplane display substrate on which OLEDs, e-ink microcapsules or other energizable components that form black and white or various colors on the display for each pixel, and, in some cases a further flexible substrate layer that operates as a ground layer. In some embodiments, such as in electrophoretic displays, the frontplane and backplane are laminated together as frontplane and backplane components. In some embodiments, the flexible display 48 may be built in layers, e.g., starting with the backplane and ending with attaching the frontplane substrate.

As illustrated in FIG. 14, the display area 100 formed on the backplane component 101 of such a display 18 may be generally rectangular in shape and have a large aspect ratio, e.g., an aspect ratio where the length of the display area 100 is at least two times greater than the width of the display area 100, and, in some configurations, is at least five times greater than the width. The display area 100 includes any number of pixels or pixel elements, each of which may be connected to at least two lines (e.g., electrical lines, lead lines, electrodes, connecting lines or connectors) for energization thereof. The electrical lines or connecting lines are disposed at the pixel elements and exit from the display area 100 via various sides of the display area 100. Generally, each line services a particular row or column of pixel elements. As such, in FIG. 14, the connection lines are illustrated as a first set of connecting lines 102 coming from at least one of the longitudinal sides and including a line 102 for each of y columns of pixels of the display area 100 (e.g., a set of longitudinal connecting lines), and a second set of connecting lines 104 coming from one of the transverse sides of the display area 100 and including a line 104 for each of x rows of pixels of the display area 100 (e.g., a set of transverse connecting lines). As is known, energization or connection between a particular connecting line 102 of a column $y_n$ and a connecting line 104 of a row $x_m$ of the display area will energize or turn on that corresponding pixel, and, as such, the corresponding pixel may be referred to using its two-dimensional coordinates, e.g., $(x_m, y_n)$ or $(y_n, x_m)$. In any event, as illustrated in FIG. 14, the sets of connecting lines 102, 104 exit from the display area 100 along the same backplane substrate 101 and are connected to one or more multiplexer or IC driving circuits 108 via a flex connector 110. Although in FIG. 14 the driving circuits 108 are shown as being disposed on the flex connector 110, in some embodiments, at least some of the driving circuits may be formed, for example, on or near the edge of the backplane display substrate 101. Indeed, at least some of the driving circuits 108 may be integral with the display driver 62 of the electronic suite 50, and/or at least some of the driving circuits 108 may be disposed separately from but nonetheless communicatively connected to the display driver 62, e.g., the driving circuits 108 are disposed on the flexible connector 110 connecting the backplane layer 101 to the electronics module 19, or the flexible connector 110 connects respective connecting lines 102 or 104 to driving circuits 108 disposed on the backplane layer 101. Typically, the flexible connector 110 is not integral with the backplane layer 101, but instead is a separate element that couples to the backplane layer 101 to communicate with the electronics module 19 and components included therein, such as the display driver 62.

Figure 15:
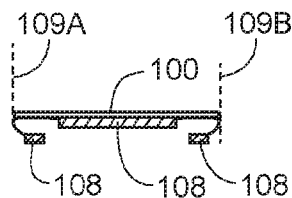
FIG. 15 illustrates a manner of bending the flexible display element substrate of FIG. 14 to form a flexible display with maximal display area on the top of a wristband device.

FIG. 15 illustrates a manner of folding or bending the substrate 101 of FIG. 14, to form a display that includes a maximum amount of display area 100 on the top thereof that is viewable to the user, so as to maximize the amount of area on the band 12 at which the display area 100 is viewable and to minimize the area of edges surrounding the display area 100 that are visible to the user. (For ease of viewing, the flexible connector 110 is not shown in FIGS. 15-16.) In FIG. 15 in particular, the bending may occur along the dotted line 109A, illustrated in FIG. 14, so as to fold over the backplane sections adjacent to the longitudinal side of the display area 100 at which the connecting lines 102 are disposed. This folding enables the connecting lines 102 to be bent down and under the display area 100, and enables the multiplexer or IC driving circuits 108 to be connected to the display driver 62 (disposed in, for example, one of electronics module 19 not shown in FIGS. 14-16) via separate electronics or electrical connections. Thus, as illustrated in FIG. 15, which depicts a cross-sectional end view of the flexible display 18, the flexible display 18 so formed and bent enables the separate longitudinal display lines 102 to be connected to different multiplexer or driving IC circuits 108, which are ultimately connected to the display driver 62 of FIG. 10, in order to energize the rows and columns of pixel elements of the flexible display 18 to thereby drive the display 18. As the fold 109A occurs along the edge of the display area 100, the areas of the backplane substrate of the flexible display 18 that are used to form the connecting lines 102 are disposed in a different plane than, and are disposed in some cases under the display area 100, and thus do not require the backplane substrate 101 to extend out towards the sides of the band 12 much beyond the edges of the display area 100. This configuration, in turn, enables the maximal amount of viewable display area to be disposed on the top portion of the band 12 which maximizes the viewable or usable area of the band 12 at which the display 18 can present viewable images. In some embodiments, the backplane substrate 101 may also be bent along the dotted line 109B along the opposite longitudinal side, even if the opposite longitudinal side does not support any electrodes or connectors thereon, e.g., for ease of manufacturing and/or for aesthetic considerations. Further, in some embodiments, additionally or alternatively a bending or folding of the transverse side of the substrate (e.g., along the dotted line 112a) or of the flex connector 110 (e.g., along the dotted line 112b) may allow the flex connector 110 to connect to the electronics module 19 (not shown), thereby communicatively connecting the connecting lines 102, 104 and the electronic module 19.

Figure 16:
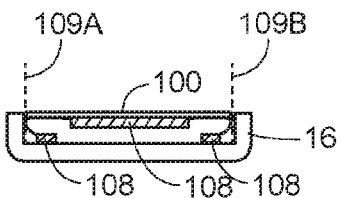
FIG. 16 illustrates an end view of a flexible display configured as provided in FIG. 15 disposed within flexible substrate with side protection structure.

FIG. 16 illustrates a cross-sectional view of the display 18 bent as illustrated in FIG. 15 and disposed in or on a flexible support 16 of the band 12, with the display 18 having the maximal display area 100 thereon disposed up to the edges of the band of the device 10. In this case, the flexible support 16 is illustrated as having sidewalls to form a protective barrier to protect the display 18 at the edges thereof from side impacts. Of course, other manners of manufacturing the display 18 could be used and implemented to produce the dynamically flexible, attachable article or device 10.

FIGS. 17A-17C, 18A-18E, 19A-19C, and 20 illustrate an embodiment of the band device 10 which provides for a maximal continuous usable or viewable display surface by assuring that the discontinuity in the electronic display falls at a position adjacent to the user's outer wrist. In particular, the device 10 illustrated in FIGS. 17A-17C includes a band 12 extending between two end pieces 14A and 14B which may be metal, plastic or other material that provides a pleasing look. An electronics module 19 having an exterior casing or cover is disposed on the band 12 at a position between the two end pieces 14A and 14B, but is not centered between the two end pieces 14A and 14B. In particular, the electronics module 19 is disposed closer to one end piece 14B than the other end piece 14A. FIG. 17C illustrates a top view of the device 10 showing a continuous flexible electronic display 18 extending between the two end pieces 14a and 14B. In this configuration, the end pieces 14A and 14B form at least a portion of a connection or clasping mechanism that is similar in nature to that described with respect to FIGS. 2, 4, 8B, 9C. As such, the end pieces 14A and 14B can be connected in an end-to-end arrangement so that the device 10 is clasped in a continuous circle or oval with a fixed or predetermined length.

Figure 18A:
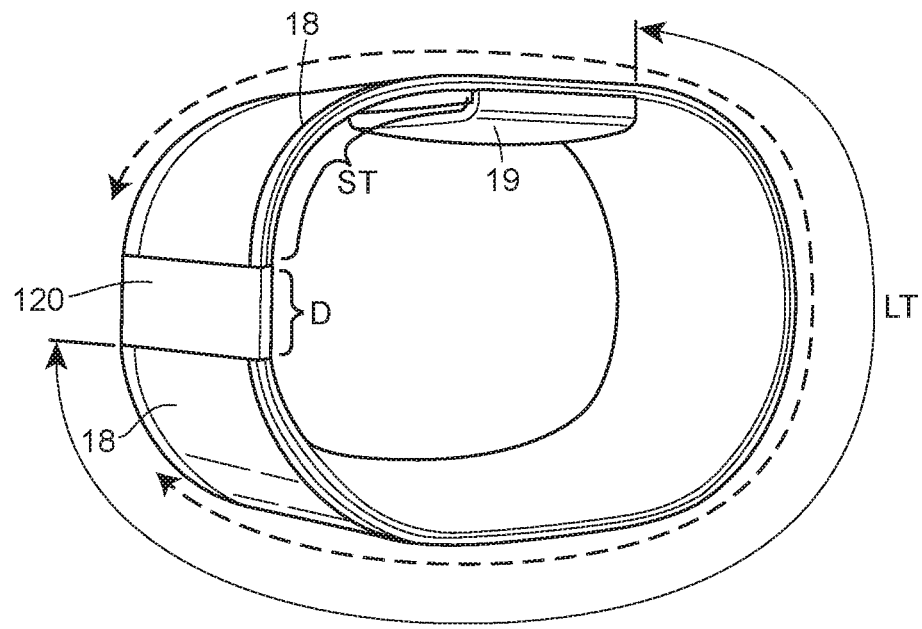
FIG. 18A illustrates a wristband device including one extender that increases a length of the device and connects the ends of the wristband device together in an end-to-end manner so as to provide maximal continuous display surface to a user when wearing the band.
Figure 18B:
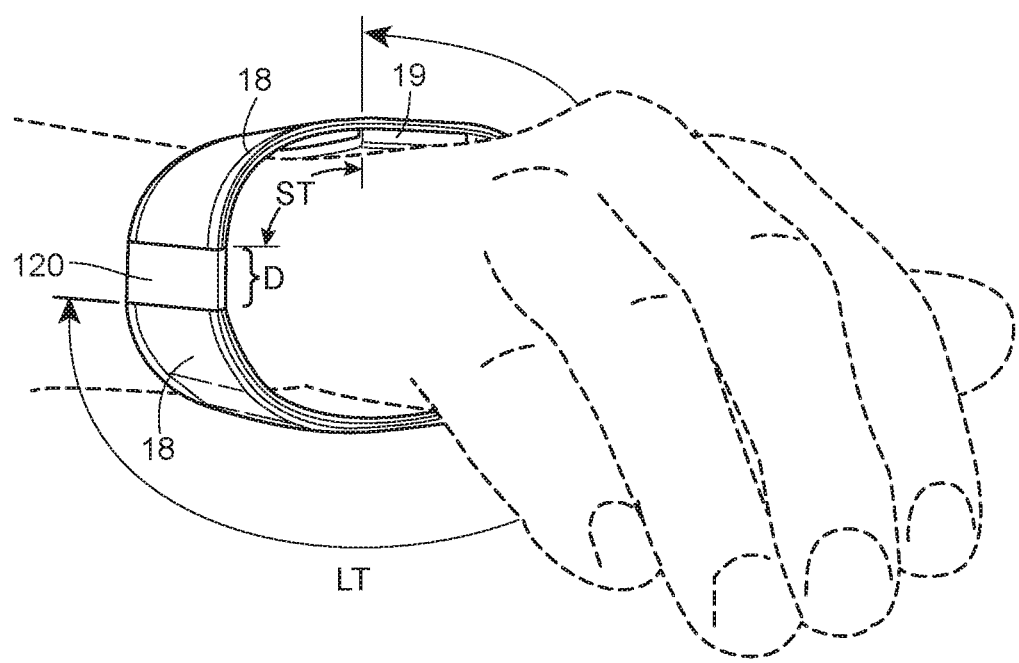
FIG. 18B illustrates the band of FIG. 18A when connected around a user's wrist.

In this case, the electronics module 19 (or the cover associated with that module) acts as a reference mark or reference location that is to be placed at a particular position on a user's wrist, in this case, on the top of a user's wrist. When so placed, the sections of the band 12 extending out from the module 19 are sized to overlap at a position adjacent to the outer or ulnar side of the wrist of the user. FIGS. 18A and 18B illustrate the band device 10 having one extender 120 removably coupled to the ends 14A and 14B of the band 12 and configured to connect the ends 14A, 14B of the band 12 together in an end-to-end manner. Here, as illustrated by a user's wrist in dotted relief in FIG. 18B, the position of the extender 120 corresponds (e.g., is adjacent) to the outer or ulnar side of the user's wrist. As such, the flexible electronic display 18 forms a continuous display from the top of the wrist, through the inner side of the wrist to the bottom of the wrist as illustrated by the arrow in FIG. 18A. This continuous usable display enables a user to view a long continuous screen or multiple serial display screens disposed next to one another on the display 18 without there being any discontinuity in the display of these screens, as the user turns his or her wrist between a palm up and a palm down position or vice versa. While the illustration of FIGS. 18A and 18B depict the band device 10 on a right wrist of a user, the band device 10 could be similarly placed on the left wrist with the module 19 still adjacent to the top of the wrist and the ends of the band 12 connected via the extender 120 on the outer side of the wrist.

Figure 19C:
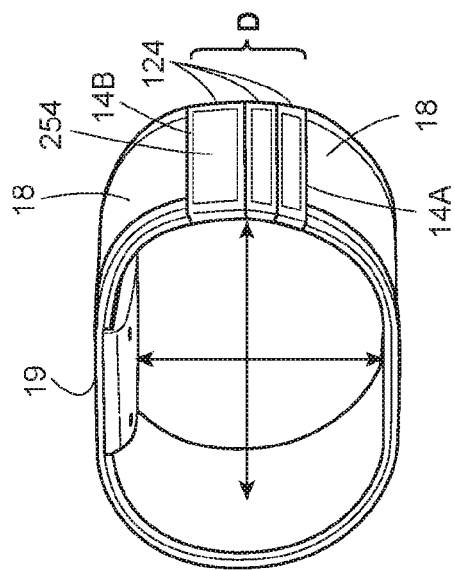
FIGS. 19A-19C illustrate a wristband device adjusted to fit various different sized wrists but still providing a maximal continuous useable display surface area to the user
Figure 19B:
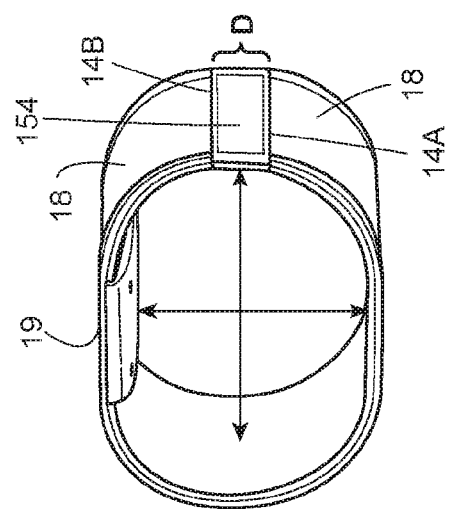
Figure 19A:
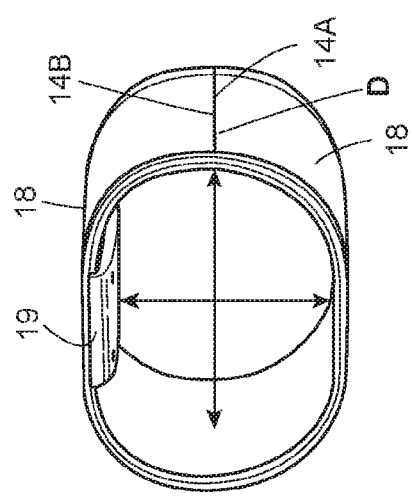

FIGS. 19A-19C illustrate an embodiment of the band device 10 which provides for a maximal continuous usable display surface by assuring that the discontinuity in the electronic display falls at a position adjacent to the user's outer wrist. In particular, FIGS. 19A-19C illustrate that a length of the device 10, and in turn the size of the device 10, can be adjusted while still providing a flexible electronic display 18 with maximal continuous usable surface area, e.g., in a manner such as previously discussed with respect to FIGS. 9A-9C. The device 10 illustrated in FIG. 19A does not include any extenders 40, such that the device 10 has its standard or normal length. The device illustrated in FIG. 19B includes one extender 124, which serves to increase the length of the device 10 and, in turn, creates a more-oval or flatter shaped device 10 than the device 10 in FIG. 19A when in the folded position. The device illustrated in FIG. 19C includes three extenders 124, each having a different size. The two additional extenders 124 serve to further increase the length of the device 10, thereby creating an even more-oval or flatter shaped device 10 than the device 10 in FIG. 19B when in the folded position. In FIGS. 19B and 19C, the position of the extender(s) 124 substantially corresponds (e.g., is adjacent) to the side of the user's wrist and, in particular, the outer or ulnar side of the user's wrist. As such, the flexible display 18 continues to provide a continuous display from the top of the wrist, through the inner side of the wrist to the bottom of the wrist, while at the same time the device 10 can be adjusted to be smaller or larger in size.

Figure 20:
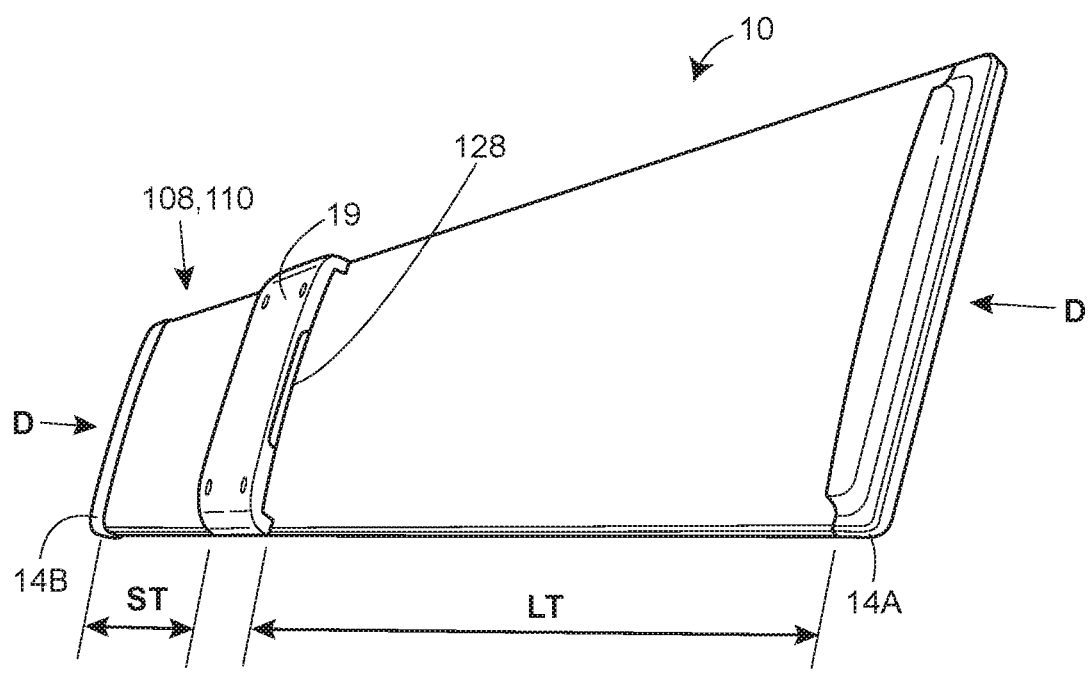
FIG. 20 is a perspective view of the band of FIG. 19A laid out in a flat configuration.

For the sake of completeness, FIG. 20 illustrates the back of the device 10 of FIGS. 19A-19C when the band 12 of the device 10 is laid out flat or straight. As can be easily seen in FIG. 20, the electronics module 19 sticks up (or down) from the surface of the band 12 and thus provides a tactile sensation to the user when the user wears the band. This feature, in turn, makes using the module 19 as the reference point for the user when placing the band on the user's wrist more natural, as the user can feel the presence of the module 19 in the correct location on the top (or bottom) of his or her wrist, and thus will know that the band is properly aligned on the wrist to provide for a maximal continuous usable display surface in the manner described above. Still further, as illustrated in FIG. 20, the electronics module 19 may have a single or multiple contact points 128 that may be used to charge a battery (not shown) disposed within the electronics module 19, or to provide other communications between the electronics module 19 and another device such as a base station or a base unit.

While in FIGS. 17-20 the electronics module 19 is described as serving as a reference member or point, the device 10 can provide or have additional or different reference members, reference points, or other reference guidance. The reference guidance could, for example, take the form of a visible mark on the band 12 (e.g., a printed mark), a weighted element attached to the band 12, or an electronic sensor that determines the orientation of the band. Further still, the reference guidance could be provided on or via the flexible display 18. For example, the flexible display 18 may provide the outline of a user's wrist as reference guidance for the user when attaching the device 10 to his/her wrist.

As will be understood, the wristband device 10 as described above can be configured and operated in many different manners to perform many different functions at the same or at different times. For example, the wristband device 10 may operate to execute any number of different types of applications including, for example, calendar applications, e-mail applications, web-browsing applications, picture, image or video display applications, stop-watch or other timing applications, alarm clock or alarming applications, location based applications including for example mapping applications, navigational applications, etc. In some cases, various different applications or functionality may be performed simultaneously, and different sections or portions of the flexible display 18 may be used to display information associated with the different applications. For example, one portion of the flexible display 18 may be used to illustrate calendar information provided by a calendar application, another portion of the flexible display 18 may be used to illustrate e-mails associated with an e-mail application and a still further portion of the flexible display 18 may be used to display a clock or stop watch associated with a timing application. Still further, the applications 78 executed on the device 10 may be executed on and display information computed solely with the electronics suite 50 of the device 10. In another case, one or more applications 78 may be executed on the processor 54 of the device 10 to interface with and display information received from external computing devices, such as a mobile phone, a laptop computer, a desktop computer, etc. In this case, the device 10 may act as a slave display device or may operate in conjunction with information received from the external computing device to provide information, graphics, etc. to a user on the flexible display 18 of the wristband 10. The wristband 10 may communicate with external devices or an external network via any desired communication hardware, software and communications protocol, including any LAN or WAN based protocol, an NFC protocol, a Bluetooth protocol, an IP protocol, an RFID protocol, etc.

FIGS. 21A-22E illustrate various different types of displays or images which may be provided on the flexible display 18 of the wristband device 10 at various different times or even at the same time. For example, in one scenario illustrated in FIG. 21A, the display 18 may depict a pattern, an artistic rendition or other image that is particularly expressive of the wearer or user, including for example, an image provided by the user, a picture or a photo, an image of a hand-drawn sketch, a team, corporate or other organizational logo, a message of some sort, or some other image that expresses some interest or personality trait of the user. Such an image might be displayed whenever the wristband device 10 is in a sleep mode, that is, when the wristband device 10 is not being actively used in other modes. Moreover, such an image could be resident on the display 18 for long periods of time whenever the display 18 is not in use, if the flexible display 18 is a bi-stable display, such as an e-ink display, which requires no power to hold the image in place once image is been formed.

Figure 21A:
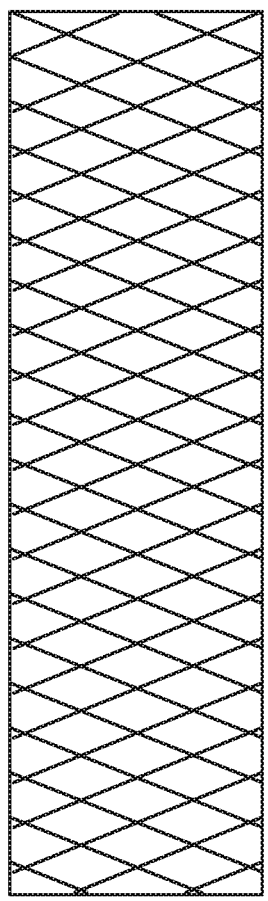
FIGS. 21A-21E illustrate various example display images that can be provided on the wristband device in different operational modes of the wristband device.
Figure 21B:
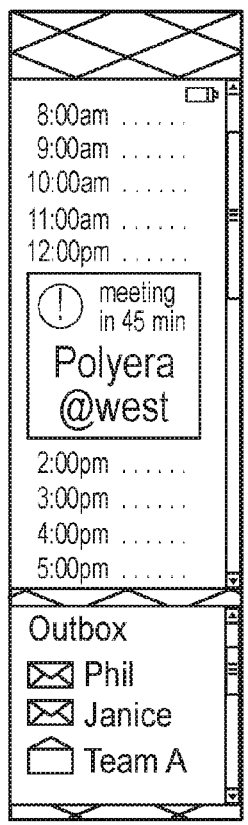

As illustrated in FIG. 21B, in another mode referred to herein as an office mode or a calendar mode, the wristband device 10 displays a calendar screen and an e-mail screen or other images associated with or set up to provide office or business related functionality. Such a mode may provide images that enable the user to easily view e-mails, calendars and to use other business related applications. Thus, for example, the display shown in FIG. 21B may provide a calendar of events, and may also display one or more e-mail icons, text messaging icons, etc., indicating e-mails or text messages that may be available and viewable to the user.

Figure 21C:
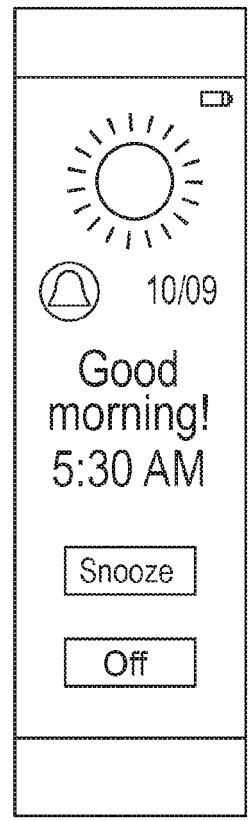
Figure 21D:

FIG. 21C illustrates the wristband device 10 in an alarm/clock mode in which the flexible display 18 provides an alarm or clock display that may be generated by an alarm or clock application. An alarm may ring by sounding a speaker (e.g., one of the electronic devices 70 of FIG. 10) at a particular time according to a preset alarm notification and/or the device 10 might use a gyroscope, accelerometer, or one or more other suitable vibrating elements 68, 70 to vibrate the device 10 to cause a vibration pattern indicating an alarm. Still further, as illustrated FIG. 21D, the wristband device 10 may be placed in an exercise or training mode in which the flexible display 18 displays a stopwatch, a distance traveled or other indications of various athletic parameters that have been met or associated with an exercise routine including, for example, use of the step counter to determine the number of steps that have been taken, to determine the number of lifts that have been performed when, for example, lifting weights, etc. Likewise, in such a mode, the display 18 may display a distance traveled by a runner or walker, the time since the beginning of a run or other exercise, etc. Still further, as illustrated in FIG. 21D, a portion of the display 18 may be used to indicate the current song that is playing via a music application implemented on the article 10. Additionally, the display 18 may include a section showing a current heart rate of the user, e.g., as detected by a heart rate monitor included on the device 10. Note that in FIG. 21D, the heart rate monitor of the display 18 is oriented so that when the device 10 is attached around the wrist of the user, the heart rate display is oriented on the inside of the user's wrist in a direction that enables the user to quickly view the information displayed thereon.

Figure 21E:
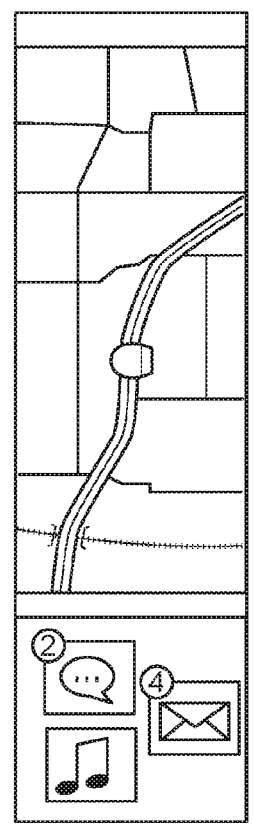

In a still further mode, illustrated in FIG. 21E, the wristband device might be a slave display to another computer device, such as a navigation device within a car, a phone, a laptop computer, an e-reader. In this case, the display 18 may display, for example, a map, a route, directions, etc. on a map as provided by a navigation device to the wristband device 10 via, for example, a Bluetooth communication module or other communication module that provides communication between the wristband device 10 and the navigation device (not shown). Such a slave display might enable the wristband device 10 to be more visible to the user in a driving situation. For example, the wristband device 10 may be attached around a person's wrist or around a stand or other support within a vehicle so that the display 18 is visible to the driver or to a passenger. Of course, other types of visuals and displays can be provided with other types of applications stored on the wristband device 10 or in other communicatively coupled computer devices, such as phones or computers, which communicate with the wristband device 10 to provide images or information for display to the user. For example, FIG. 21E includes an additional portion of the display 18 presenting thereon a slave display of other selected applications such as an email mailbox, a text messaging application, and a music application as hosted on another device (e.g., on a smartphone or other portable wireless device). In FIG. 21E, the additional portion is oriented so that when the device 10 is attached around the wrist of the user or around differently-sized in-vehicle support structures, the slave display of the application icons are oriented in a direction suitable for viewing.

Figure 22:
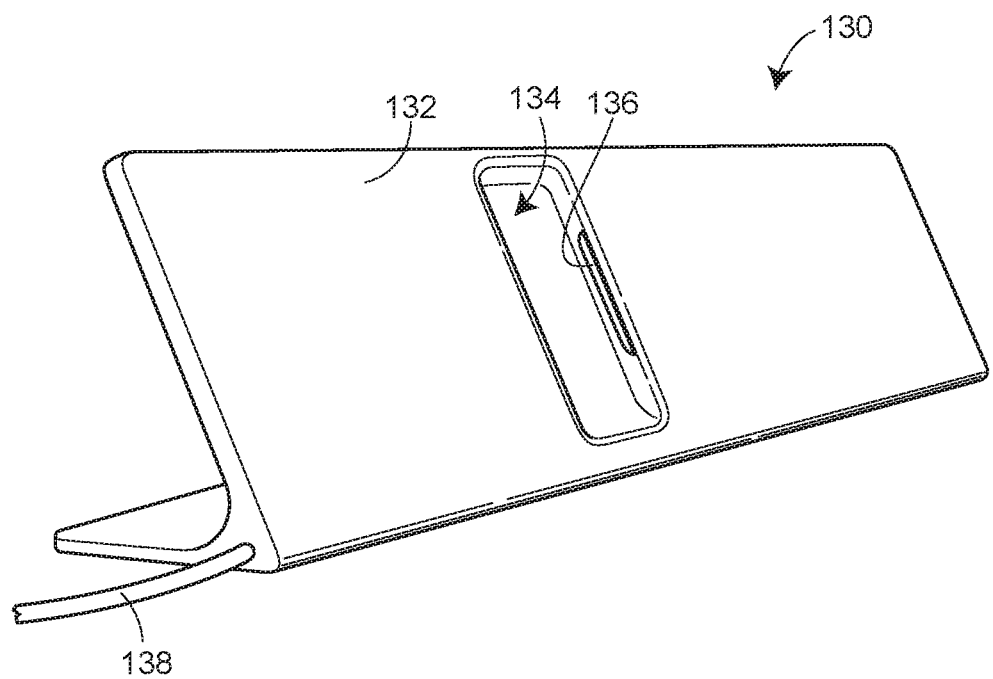
FIG. 22 illustrates a stand that may accept and hold one of the wristband devices disclosed herein when not being worn by a user.
Figure 23:
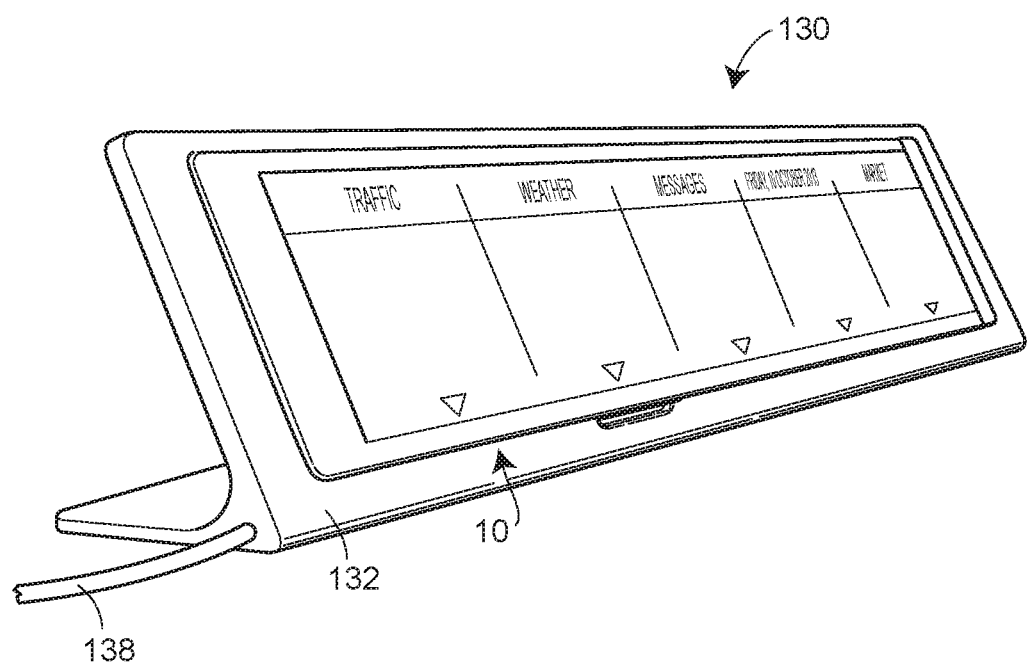
FIG. 23 illustrates the stand of FIG. 22 with a wristband device of disposed thereon.

As another example, FIGS. 22 and 23 illustrate a base station (such as a charging station 130) that can be used to hold and optionally charge a device 10. As depicted in FIG. 22, the base station 130 may include a flat panel 132 having a recess, an indent or a space 134 formed therein. In this case, the device 10, when laid out flat as illustrated in FIG. 8 or FIG. 20, may be placed against the flat plate 132 so that the electronics module 19 fits within the indent, recess or space 134. Magnets within the band 12 of the device 10 may be magnetically attracted to metal or other magnetically permeable material (including magnets) within the stand 130 (not shown) and help to hold the device 10 in place on the stand 130. When so located, the charging contact 128 of the band 10 as illustrated in FIG. 20, comes into contact with or is disposed near a charging contact 136 of the stand 130, which when plugged into a source of power via a cord 138 operates to charge the battery of the device 10. As noted earlier, the charging contacts 136 and 128 may operate to provide direct charging or inductive charging to the battery within the electronics module 19. Of course, the stand 130 may include a charging unit (not shown) to provide the proper or appropriate charging signals to the charging contact 136 and this charging unit may be a direct charging unit or an inductively coupled charging unit.

Moreover, as illustrated in FIG. 23, the device 10, when disposed on the stand 130 may detect an RFID tag or other communication signal emanating from the stand 130 and operate in a preconfigured manner based on the detection of that signal. For example, as illustrated in FIG. 23, the band 10 may provide a display with various screens or sections including, for example, a traffic section, a weather section, a messages section, an alarm or clock section, etc. Each of these sections may provide information about or related to the traffic (received via a WiFi or other communication connection), weather (received via a WiFi or other communication connection), messages (received via an e-mail or text messaging services or applications), time or alarm information, etc. Of course the operation of the band device 10 when placed on the stand 130 can be configured in any desired manner by a user, for example.

Figure 24:
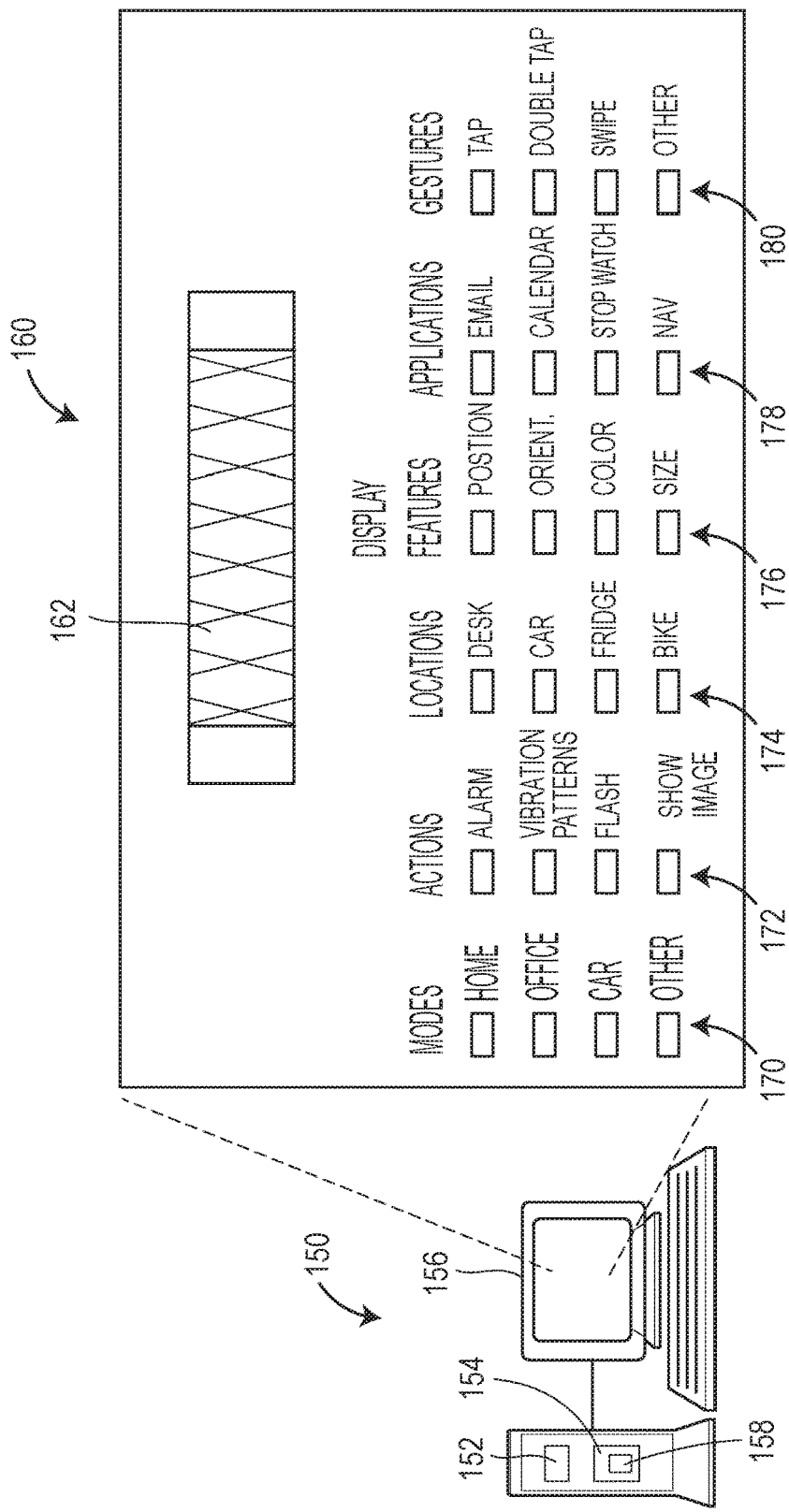
FIG. 24 illustrates an example computer system with a configuration screen that may be used to implement or specify the configuration of a dynamically flexible, attachable device.

More generally, the user may be able to program or configure the device 10 to operate in any desired manner, including any desired default manner, based on the detected location, position, orientation, or movement of the device 10. In this case, a configuration application may be executed in a processor of a computer device to develop or configure the operation of the wristband device 10, including the various operational modes of the device 10, the various default settings based on the mode of the device 10, the motions or actions or locations that may trigger particular modes of the device 10, inputs or gestures associated with each mode or application of the device 10 and what those inputs or gestures may mean in the context of the device 10, etc. As an example, FIG. 24 illustrates a computer 150 having a processor 152, a memory 154 and a display 156. The memory 154 stores a configuration application 158 that may execute on the processor 152 to enable a user to configure the operation of the wristband device 10. In particular, the configuration application 158, when executed, may produce a configuration screen such as the configuration screen 160 illustrated in FIG. 24. The configuration screen 160 may display an image of the wristband device 162 to illustrate what will be displayed on the display 18 of the wristband device 10 at various times, and the manner in which this information will be displayed, such as the orientation, position on the display 18, etc.

In addition, as illustrated in FIG. 24, the configuration screen 160 may present a number of boxes or drop down menus, etc. which can be used to define various modes or other operational settings of the device 10 and the default operation of the device 10 during each such mode. For example, a user may select one of a set of mode boxes 170 to define the configuration of a particular mode of the device 10. The user may select a sleep mode box, an office mode box, an exercise mode box, a home mode box, a car mode, or may select an "other" box to define a new mode for which the device 10 is to be configured. Upon selecting the appropriate mode box 170, the user may be presented with information or options about the default and other operations of the device 10 during the selected mode. For example, the user may be able to define the actions 172, locations 174, etc. that might be used to enter a particular mode. Thereafter, another set of menus or drop down boxes or windows may be used to enable a user to define the placement, content, orientation, etc. or other display features 176 of information to be displayed on the flexible display 18. Still further, the user may select one or more applications 178 to execute during a particular mode, the placement, size and area of the screen associated with the application display, the orientation of the display on the screen, the background features, borders features or other screen indicia, etc. Likewise, the user may define one or more RFID tag IDs or other IDs to define exterior locations (e.g., the stand 130 or some other location) that are to be associated with or that cause the wristband device 10 to enter or operate in a particular mode. In this manner, the configuration application 158 enables the wristband 10 to have default functionality based on the functions to be provided, based on the location of the device 10, based on its orientation or position around the wrist or not being connected around the wrist, based on movement of the device 10, etc.

In another case, the configuration screen 160 may enable the user to define one or more gestures 180 associated with a particular mode or a particular application on the device 10. Thus, for example, the user might define a gesture that, when detected on the touch screen interface 26 of the device 10, such as a swipe gesture, a pinch gesture, a double tap gesture, etc. causes the device 10 to operate in a certain manner, such as to switch between modes, to change orientation of the image on the display 18, to cause portions of the displayed information to move or to appear or disappear, or to cause a particular action within an application, such as to pull up new information, etc. Thus, using the configuration application screen 160, the user may define various different gestures or may preprogram various gestures to define desired device functionality, such as switching between modes, turning on and off the device or applications, switching applications, moving images or content of particular applications on the display 18, taking actions within an application, acknowledging a receipt of an incoming message, etc. As a further example, one gesture may be defined by the user to unlock the device 10 or allow operation of the device 10 such as implementing a locking or security feature. In this case, is not necessary that the device 10 display numbers or have the user pick a set of numbers but instead, gestures might enable the user to define an action that will unlock device, such as a swipe in one direction, two taps and a swipe in a particular direction, etc. Of course, the same gesture could be used for different types of operations in different modes of the device 10 or with different applications implemented by the device 10, and any combination of gestures might be used with any combination of applications or modes to enable different functionality or to enable the functionality of the device 10 be programmed in various manners. Once configured as such, the configuration data as selected by the user via the configuration application 158 on the computer 150 can be downloaded to the device 10, either wirelessly or via a wired connection, and stored in the memory 58 thereof and then be used by the operating system of the device 10 to operate. Of course, in some embodiments, at least a portion of the configuration application 158 is stored at and executed on the device 10 itself (e.g., stored on the memory 58 and executed by the processor 54 of the device 10) in addition to or as an alternative to being stored and executed on a separate computing device 150. In some configurations, the device 10 is entirely configured by the user via the local user interface of the device 10 (e.g., using the touchscreen 26).

With further regard to providing a maximal continuous usable or viewable display surface, e.g., as previously discussed with respect to FIGS. 17-20, such a maximal continuous, usable or viewable display surface or area should roll over the edge of a user's wrist, e.g., on the ulnar side, radial side, or both. For example, in some embodiments, the area of the dynamically flexible, attachable article or device 10 on which the electronics module 19 is disposed is less flexible than the remainder of the article or device 10 as, for example, the electronics module 19 is included in a protective housing, cover or casing. Accordingly, for wearer comfort, the user typically positions the electronics module 19 on a flat surface of his or her wrist, e.g., on the top or the bottom of the wrist. Consequently, to maximize continuous, usable or viewable display area, the viewable display surface is not limited to only the area or plane that is parallel to the top or bottom surface of the user's wrist, but the viewable display surface is multi-planar and continues in a plane different than the plane parallel to the top or bottom of the user's wrist such as by curving over one or both edges of the user's wrist. For example, as shown in FIGS. 17-20, at least a portion of the flexible display extends past the area of article or device 10 on which the electronics module 19 is disposed. Said extension is referred to herein as "tail" of the article or device. Note that in FIGS. 17-20, each device 10 is illustrated as having two tails, as the viewable surface area of the display extends past the electronics module 19 at both ends in a curved manner.

Further, while wearing the dynamically flexible, attachable article 10, a user is likely to position the discontinuity D of the flexible display (e.g., the portion of the display whose continuity is interrupted due to the connectors 14A, 14B and any extenders 40 included in the article or device) at a location on his or her wrist that is not viewable by the user, such as at the far or ulnar side of the wrist. As such, an article or device 10 typically includes a shorter tail ST (referred to herein as a "short tail") and a longer tail LT (referred to herein as a "long tail"), each of which provides a continuation of the viewable display area in one or more planes different than that of the electronics module 19. The discontinuity D, the short tail ST and the long tail LT are labeled in each of FIGS. 17-20.

As previously shown in FIG. 20, in an embodiment of the article 10, the flex connector 110 (and optionally the display drivers 108, if disposed on the flex connector 110) is located at or in the short tail of the article 10. Indeed, in some cases, the flex connector 110 and optionally the display drivers 108 are located with or immediately adjacent to the discontinuity D of the article 10. At any rate, flex connector 110 may bend under the article 10 along the transverse end of the short tail ST so as to communicatively connect the connecting lines 102 and/or 104 with the display drivers 108 and the electronic module 19. However, the short tail ST of the article 10 is typically bent to a greater degree than other parts of the article 10, as generally the short tail ST is positioned on a user's wrist at a location with greater curvature, e.g., at the far or ulnar side of the users' wrist. Moreover, the flex connector 110 is moveable with respect to the flexible display 18 (e.g., moves or slides during use with respect to the display 18) so as not to interfere with a neutral plane of the flexible display 18, the neutral plane being where there is no tension or compression upon bending. These and other factors shorten the longevity of the leads included in the flexible connector 110, as they are subject to greater stresses over time.

Several approaches may be taken to mitigate the amount of stress to which the short tail ST, and more particularly the flexible connector 110, is subjected over time, while at the same time maintaining a maximum, viewable display area on the short tail ST and the long tail LT of an article 10, and in particular in situations in which the short tail ST (and/or the long tail LT) is curved to a greater degree, such as when curved around a user's wrist. FIGS. 25 and 26A-26F depict different examples of approaches that may be taken.

FIG. 25 depicts one such approach. FIG. 25 depicts a graphical representation of an elongated, dynamically flexible article 200 having two longitudinal sides 202a, 202b that are nonadjacent to one another and two transverse sides 205a, 205b that are nonadjacent to one another. The article 200 may include any number of any features and/or aspects previously discussed with respect to the article 10 of FIGS. 1-24. In particular, the article 200 may include any number of the features and/or aspects discussed with respect to the substrate 101 of FIGS. 14-16. Additionally, it is noted that while the article 200 is depicted as having a generally rectangular shape in FIG. 25, the article 200 may have any elongated shape so that each of the longitudinal sides 202a, 202b has a respective length greater than each of the transverse sides 205a, 205b.

The article 200 includes a fastener 208a disposed at one of the transverse sides or ends 205a of the article 200. The fastener 208a may comprise any suitable connecting mechanism that allows the article 200 to be releasably attached to itself. For example, the fastener 208a may include a buckle, one or more magnets, a tab and/or recess, and/or any number of other suitable connection mechanisms. In some configurations, a second fastener 208b is disposed at the other end 205b of the article 200, and the first and second fasteners 208a, 208b are configured to securely and releasably attach to each other, such as illustrated in FIG. 2, 4, 8B or 9C, for example.

The article 200 further includes an elongated, dynamically flexible substrate 210 on which an elongated, dynamically flexible optoelectronic area 212 is disposed. The optoelectronic area 212 includes a set of optoelectronic elements each of which may be configured to emit, reflect, transflect, and/or absorb light. In an embodiment, at least a portion of the optoelectronic area 212 is a flexible display area comprising a set of pixels, where signals provided to energize the pixels cause images to be presented on the display area. Generally, the set of optoelectronic elements may include electrically energizing components coupled to electrically energizable components, such as previously discussed above with respect to FIG. 14. For example, the dynamically flexible substrate 210 may include a dynamically flexible backplane substrate on which at least some of the optoelectronic elements are disposed, such as the substrate 101 of FIG. 14.

The portion of the dynamically flexible substrate 210 on which the optoelectronic area 212 is disposed may be a first portion of the substrate 210. The substrate 210 includes one or more other portions 215, 218a, 218b on which connecting lines 220a, 220b, 222a, 222b may be disposed. In FIG. 25, for example, the sets of connecting lines 220a, 220b are disposed on a second portion 215 of the substrate 210 that extends from a transverse end of the optoelectronic area 212, one or more sets of connecting lines 222a, 222b are disposed on a third portion of the substrate 218a extending from a longitudinal side of the optoelectronic area 212, and one or more sets of connecting lines 222c, 222d are disposed on a fourth portion of the substrate 218b extending from the other longitudinal side of the optoelectronic area 212. Each connecting line provides a communicating connection to a respective optoelectronic element. For example, if the optoelectronic area is a display area comprised of an array of pixels, each connecting line of the sets of connecting lines 222a, 222b, 222c, 222d connects to a respective pixel along the longitudinal length of the display, and each connecting line of the sets 220a, 220b connects to respective pixel along the transverse width of the display so that each pixel may be energized by one of the connecting lines from the sets 222a, 222b, 222c, 222d and by one of the connecting lines from the sets 220a, 220b. It is noted that for purposes of clarity, FIG. 25 does not illustrate each and every connecting line as a separate line; rather, each set of connecting lines are graphically represented in FIG. 25 by the lines 220a, 220b, 222a, 222b, 222c, 222d.

In FIG. 25, each flexible connector 225a, 225b extends respectively from the longitudinal sides 202a, 202b of the article 200. Each flexible connector 225 communicatively connects one or more sets of connecting lines 220, 222 to a driver or driving circuit 228. For example, as shown in FIG. 25, the flexible connector 225a communicatively connects the sets of connecting lines 220a, 222a, and 222b to the driving circuit 228a, and the flexible connector 225b communicatively connects the connecting lines 220b, 222c and 222d to the driving circuit 228b. As previously discussed with respect to FIG. 10, the drivers or driving circuits 228 are configured to send or provide signals to the optoelectronic elements of the optoelectronic area 212. For example, when the optoelectronic area 212 is a display area, the drivers 228 provide signals to the pixels of the display area to cause images to be displayed thereon. It is noted that although FIG. 25 illustrates each of the driving circuits 228 as being disposed on a respective flex connector 225, in some embodiments, one or more of the driving circuits 228 may not be disposed on a flex connector 225, but instead may be disposed on a backplane of the article 200, or may be included in the electronics module 19. Nonetheless, in such embodiments, the flexible connector 225 still provides the communicative connection between the connecting lines 220, 222 and the drivers 228.

Additionally, each flexible connector 225 communicatively connects a respective driving circuit 228 and the electronics module 19 (not shown in FIG. 25). As previously discussed with respect to FIG. 10, the electronics module 19 (and in particular, the processor 54 of the electronics module 19) may indicate the signals that the drivers 228 are to provide or send to the optoelectronic area 212. For example, an application 78 may require a particular image to be displayed, and the processor 54 may cause appropriate commands or indications to be sent to the drivers 228, which in turn generate signals that are delivered to the pixels via the flex connectors 225 and connecting lines 220, 222. Thus, in effect, the flex connectors 225 enable the optoelectronic elements of the optoelectronic area 212, the connecting lines 220, 222, the driving circuits 228, and the electronics module 19 to be in communicative connection.

As the electronic module 19 typically is positioned under the article 200 (e.g., as shown in FIGS. 7C-7E, 18A-18B, 19A-19C), the flex connectors 225a, 225b are bent or folded under the article 200 (e.g., along the dotted lines 229a, 229b) to effect the communicative connection between the connecting lines 220, 222, the drivers 228, and the electronics module 19, e.g., in a manner such as illustrated in FIGS. 15 and 16, thereby forming a zone 230. Thus, in FIG. 25, the zone 230 of the article 200 includes the electronics module 19, the driving circuits 228, and the bent-over portions of the flex connectors 225.

As discussed earlier, the electronics module 19 is generally enclosed in a protective housing. As such, zone 230 of the article 200 generally has a lesser maximum degree of flexibility than other zones 232, 235 of the article 200, as the maximum degree of flex of the zone 230 is limited by the flexibility of the housing of the electronics module 19, and (typically, to a somewhat lesser degree) by the flexibility of the driving circuits 228. Advantageously, the bent portions of the flex connectors 225 are also positioned in the zone 230, and as such, are also limited to their degree of flex based on the housing of the electronics module 19. Thus, by co-locating the electronics module 19 and the bent portions of the flex connectors 225 in a same, less flexible zone 230, and as said zone 230 in use typically is positioned on a planar surface such as the top of a user's wrist, the flex connectors 225 are protected from the stresses of repeated bending and movement, thereby increasing their durability and longevity.

Further, the configuration of the article 200 also allows for the tails of dynamically flexible optoelectronic area 212 to flex or bend without being limited by the flexible connectors 225. In particular, the short tail of the article 200 disposed in zone 232 and the long tail of the article 200 disposed in zone 235 each have a greater, maximum degree of flex or bend than the maximum degree of flex or bend of zone 230, as the zones 232, 235 do not include the relatively rigid electronics housing. Moreover, the optoelectronic area 212 extends across all three zones 230, 232, and 235, thus allowing the viewable area to extend across the zones 232, 235 and the curving thereof, such as when the article 200 is fastened around a user's wrist. The user is then able to view displayed images not only in the plane of the top of his or her wrist (e.g., the plane in which the zone 230 is disposed), but also in the curved portions of the display on the tails of the article 200 (e.g., the multiple planes in which zones 232, 235 are disposed). That is, the user is able to view displayed images across zones 230, 232, 235 of the article 200, even when the zones 230, 232, 235 have different degrees of curvature, e.g., when zones 232, 235 have respective, greater degrees of curvature than the zone 230.

Typically, but not necessarily, a segment of the side 202a is disposed between the flexible connector 225a and the transverse end 208a of the article 200 on which the fastener 208a is disposed. Additionally, a segment of the side 202b is disposed between the flexible connector 225b and the transverse end 208a of the article 200. Said segments correspond to the width of the zone 232, and may be of any desired or suitable length. Similarly, another segment of the side 202a is disposed between the flexible connector 225a and the other transverse end 208b (which may or may not have a fastener 208b), and another segment of the side 202b is disposed between the flexible connector 225b and the other transverse end 208b of the article 200. Said segments correspond to the width of the zone 235, and may be of any desired or suitable length, although in most cases the width of the zone 235 is greater than the width of the zone 232, as the zone 235 corresponds to the long tail of the article 200 and the zone 232 corresponds to the short tail of the article 200.

In the embodiment of the article 200 shown in FIG. 25, the flexible connectors 225a, 225b are diametrically opposed on either side 202a, 202b of the article 200. Additionally, the flexible connectors 225a, 225b have the same width. Similarly, the segments on either side of the flex connector 225a are respectively and diametrically opposed to the segments on either side of the flex connector 225b, and respective opposing segments have the same length. However, this is only one embodiment, and numerous other embodiments are possible. For example, at least some pairs of opposing segments may have different lengths. In another example, the article 200 may include only one flex connector 225. In yet another example, the article 200 may include two flex connectors 225a, 225b that are not diametrically opposed even though they extend from opposite longitudinal sides 202a, 202b. In still another example, more than one driving circuit 228a, 228b may be disposed on the respective flex connector 225a, 225b, or (if not disposed on the flex connector 225a, 225b) may otherwise provide signals to respective subsets of the connecting lines. Of course, other embodiments are possible.

Figure 26B:
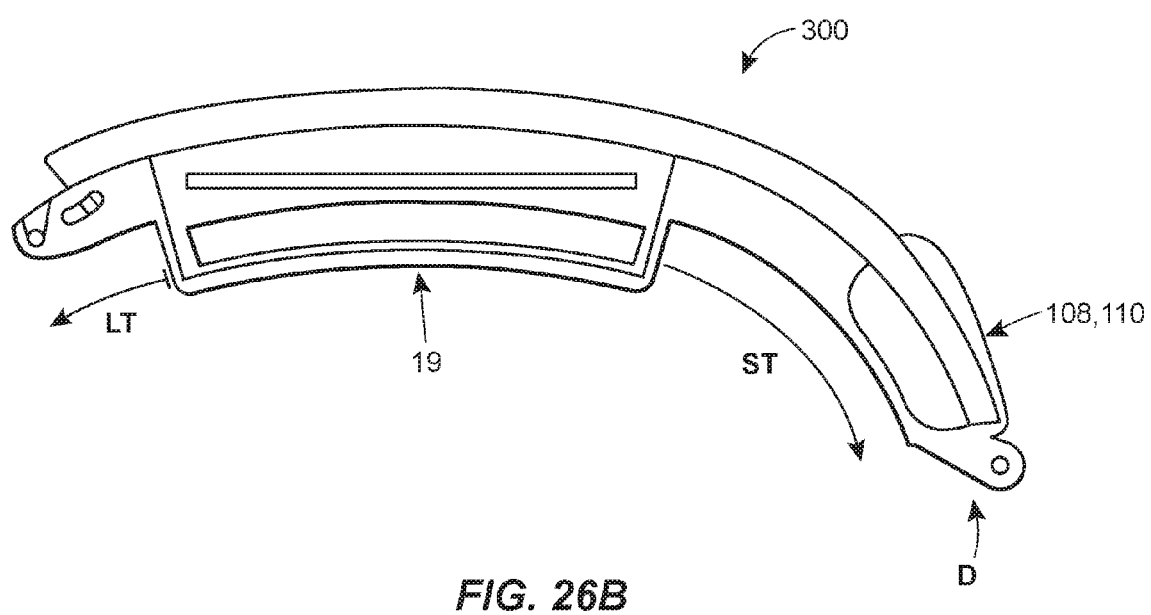
FIG. 26B is a close-up view of the rigid short tail of the article of FIG. 26A.

FIGS. 26A and 26B illustrate another approach, implemented with an elongated, dynamically flexible article 300. The article 300 is similar to the article 10 illustrated in FIG. 20, with common components identified using common reference numerals. As illustrated in FIG. 26A, the article 300 includes a long tail LT, a short tail ST, and a discontinuity D, with the flex connector 110 and (optionally the display drivers 108, if disposed on the flexible connector 110) located at or in the short tail ST of the article 300. The article 300 may additionally include any number of any features and/or aspects previously discussed in connection with FIGS. 1-24. In this example, the article 300 includes three extenders 40 and a tab and recess arrangement similar to what is illustrated in FIGS. 8A and 8B.

In the embodiment illustrated in FIGS. 26A and 26B, the short tail ST of the article 300 is rigid, i.e., not flexible. This can be accomplished in any number of ways, including, for example, forming, at least in part, the short tail ST of the article 300 from a rigid material (e.g., a hard plastic). As best illustrated in FIG. 26B, the rigid short tail ST in this example is rigidly formed at a pre-determined bend or curvature that ensures that the article 300 can be disposed around or on a wrist, an arm, etc., for example. With the short tail ST being rigid, the short tail ST, and the flex connector 110 located at or in the short tail ST, will be subject to an insignificant amount of stress over time, as the short tail ST will be minimally bent and straightened each time the article 300 is attached and unattached. At the same time, the long tail LT of the article 300 remains dynamically flexible, as described herein. In this manner, the article 300 as a whole can still be bent to be disposed around or on a wrist, an arm, etc., for example, with the tab and recess arrangement configured to mechanically connect the opposing ends of the article 300 to one another in the desired position.

It will be appreciated that the article 300 can vary and yet still mitigate the amount of stress to which the short tail ST, and more particularly the flexible connector 110, is subjected to over time. As an example, the length of the rigid short tail ST and/or the degree of the bend or curvature of the short tail ST can be varied, according to, for example, the size and/or curvature of the object around or on which the article 300 is to be disposed.

Figure 26C:
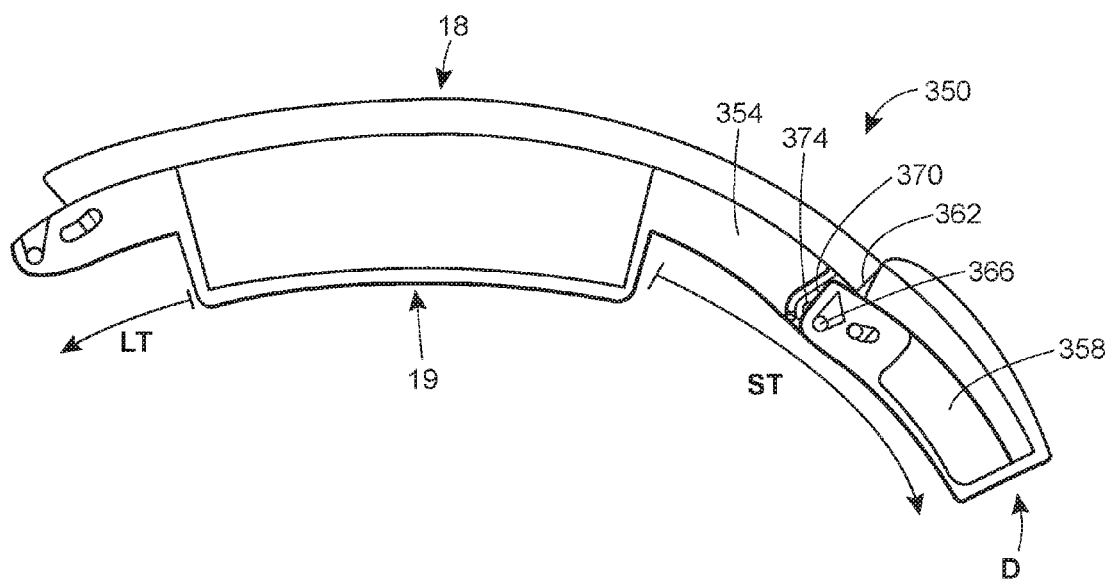
FIG. 26C illustrates a close-up, cross-sectional view of a portion of an elongated, dynamically flexible article having a semi-rigid short tail, such that the article mitigates the stresses to which the short tail would be subject to over time.

FIG. 26C illustrates another approach, implemented with an elongated dynamically flexible article 350 (only a portion of which is illustrated in FIG. 26C). The article 350 is similar to the article 300 illustrated in FIGS. 26A and 26B, with common components identified using common reference numerals. However, instead of utilizing a rigid short tail (as the article 300 does), the article 350 includes a semi-rigid short tail ST, i.e., a short tail ST with a limited bending range. As the long tail LT of the article 350 is dynamically flexible, the bending range of the semi-rigid short tail ST is less than the bending range of the dynamically flexible long tail LT of the article 350. By comparison to the other articles described herein, the bending range of the semi-rigid short tail ST of the article 350 is greater than the bending range of the rigid short tail ST discussed above in connection with FIGS. 26A and 26B, but is less than the bending range of the short tail ST illustrated in, for example, FIG. 20.

The semi-rigid short tail ST of FIG. 26C is effectuated with a single pivot. More specifically, the short tail ST includes a first portion 354 and a second portion 358 that is pivotally coupled to the first portion 354. The first portion 354 is integrally formed with the rest of the article 350 and extends outward from the module 19, terminating at an end 362. The second portion 358 includes a pin 366 that is fixed proximate to, and extends outwardly from, a first end 370 of the second portion 358. The pin 366 is movably disposed in a slot 374 formed or defined in the first portion 354 proximate to the end 362. It will be appreciated that the slot 374 defines a guide path for the pin 366, with the ends of the slot 374 defining the limited bending range of the second portion 358 and, thus, the semi-rigid short tail. While not explicitly illustrated in FIG. 26C, as the second portion 358 is moved relative to the first portion 354, thereby moving the pin 366 within the slot 374, the flexible connector 110 can experience a change in length. Such a change in length will be rather minimal, else the flexible connector 110 will fail. For example, the flexible connector 110 can experience a change in length of approximately 0.4 mm. When the flexible connector 110 experiences a change in length, the flexible connector 110 will have a longer length when the second portion 358 is pivoted, and angled, relative to the first portion 354 than when the first and second portions 354, 358 are substantially aligned with one another. In other cases, the flexible connector 110 can instead slide within the short tail ST of the article 350, thereby changing the bending radius of the flexible connector 110, which, as discussed above, is bent under the article 10 along the transverse end of the short tail ST.

So constructed, the article 350 mitigates the amount of stress to which the short tail ST, and more particularly the flexible connector 110, is subjected to over time. This is because the short tail ST has a limited bending range. In other words, the short tail ST will not be bent and straightened to the degree that it otherwise would (when no mitigating structures are utilized). At the same time, the short tail ST of the article 350 has some flexibility, such that when the long tail LT of the article 350 (not shown) is moved between a first position (e.g., a substantially flat position) and a second position (e.g., a bent or curved position), the second portion 358 can be moved, relative to the first portion 350, in a manner so that the short tail ST somewhat approximates the curvature of the surface (e.g., a wrist, an arm, etc.) around or on which the article 350 is to be disposed (and more closely approximates the curvature than the short tail of the article 300).

It will be appreciated that the article 350 can vary and yet still mitigate the amount of stress to which the short tail ST, and more particularly the flexible connector 110, is subjected to over time. As an example, the length of the semi-rigid short tail ST and/or the degree of the bend or curvature of the first and/or second portions 354, 358 of the short tail ST can be varied, according to, for example, the size and/or curvature of the object around or on which the article 300 is to be disposed. As another example, the shape and/or width of the slot 374 can be altered so as to vary the defined guide path for the pin 366, and, in turn, vary the bending range of the second portion 358. If desired, the first and second portions 354, 358 can be pivotally coupled to one another in a different manner. For example, the pin and slot arrangement of the article 350 can be altered so that the slot 374 is formed in the second portion 358 and the pin 366 is fixed and extends outwardly from the first portion 354. Further yet, the semi-rigid short tail ST can be effectuated using a different mechanism or mechanical structure than the pin 366 and the slot 374, such as, for example, any one of the structures described in International Application No. PCT/US14/72328, filed Dec. 24, 2014, the entire disclosure of which is hereby expressly incorporated by reference herein for all uses and purposes.

Figure 26D:
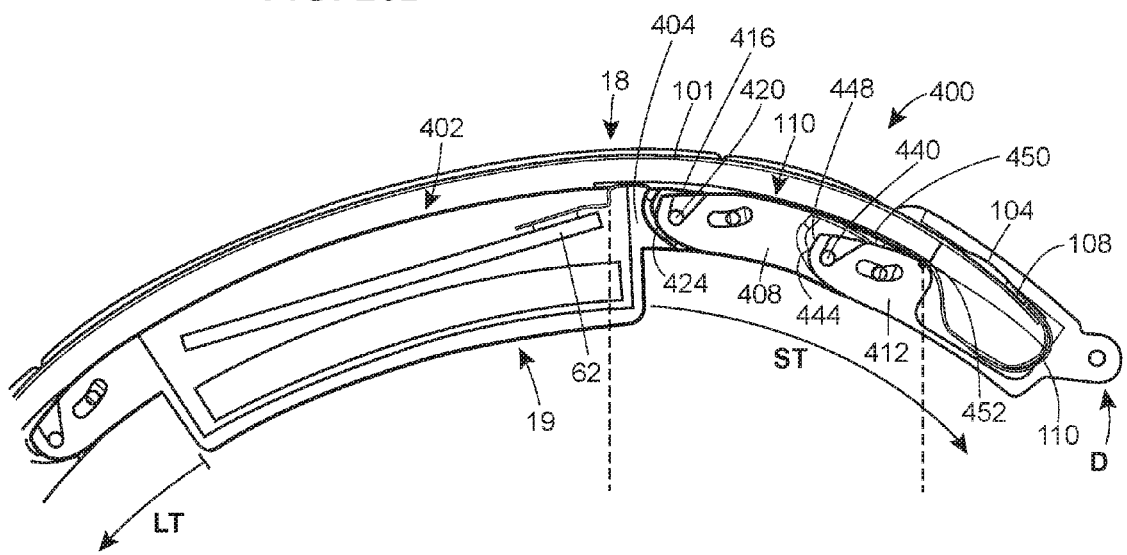
FIG. 26D illustrates a close-up, cross-sectional view of a portion of an elongated, dynamically flexible article having a flexible short tail constructed so as to mitigate the stresses to which the short tail would be subject to over time.
Figure 26E:
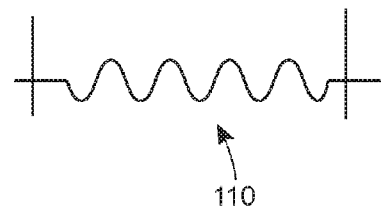
FIG. 26E illustrates a top view of a flexible connector of the flexible short tail of FIG. 26D.

FIGS. 26D and 26E illustrate another approach, implemented with an elongated, dynamically flexible article 400 (only a portion of which is illustrated). The article 400 includes many of the features and/or aspects of articles 10 illustrated in FIGS. 14-16 and 20, with common components identified using common reference numerals. Specifically, the article 400 includes the support 16 and the flexible display 18, which is disposed over the support 16 and coupled to the support 16. In this case, the flexible display 18 is coupled to the support 16 via a foam interlayer 402 disposed therebetween. While only illustrated in FIGS. 26D and 26E, it will be appreciated that any of the articles 10 illustrated herein (e.g., the articles 10 illustrated in FIGS. 26A and 26B) can include a foam layer that is disposed between, and serves to couple, the flexible display 18 and the support 16. The article 400 also includes a short tail ST, a long tail LT, and a discontinuity D. The article 400 further includes the backplane substrate 101, as well as the connecting lines 102 and 104, though only the connecting lines 104 are illustrated in FIG. 26D. In this example, at least one of the IC driving circuits 108 is formed on the backplane substrate 101 in the short tail ST. The connecting lines 102, 104 exit from the display area 100 along the backplane substrate 101 and are connected to the at least one IC driving circuit 108 in the short tail ST, as illustrated in FIG. 26D. The flex connector 110 is connected to the at least one IC driving circuit 108, is folded around and under the display area 100, and is connected to the display driver 62 in the electronics module 19. The article 400 may include any number of any of the other features and/or aspects previously discussed in connection with FIGS. 1-24.

In the embodiment illustrated in FIGS. 26D and 26E, the short tail ST of the article 400 includes a fixed portion 404, a first link 408 that is pivotally coupled to the fixed portion 404, and a second link 412 that is pivotally coupled to the first link 408. The fixed portion 404 is integrally formed with the rest of the article 400 and extends outwardly from the module 19, terminating at an end 416. The first link 408 includes a pin 420 that is fixed proximate to, and extends outwardly from, a first end 424 of the first link 408. The pin 420 is movably disposed in a slot formed or defined in the fixed portion 404 proximate to the end 416 (the slot is not visible in FIG. 26D). It will be appreciated that this slot defines a guide path for the pin 420, with the ends of the slot defining the bending range of the first link 408. Like the first link 408, the second link 412 includes a pin 440 that is fixed proximate to, and extends outwardly from, a first end 444 of the second link 412. The pin 440 is movably disposed in a slot 448 formed or defined in the first link 408 proximate to an end 450 of the link 408. As with the slot of the fixed portion 404, it will be appreciated that the slot 448 defines a guide path for the pin 440, with the ends of the slot 448 defining the bending range of the second link 412. The bending range of the short tail ST is defined by the bending range of the first link 408 in combination with the bending range of the second link 412.

With continued reference to FIG. 26D, the flex connector 110 is arranged in the short tail ST so that it is freely movable between the display driver 62 and a point 452 at which the flex connector 110 is adhered (e.g., glued) to the interlayer 402. As illustrated in FIG. 26E, the flex connector 110 has a serpentine shape, such that the flex connector 110 has the "slack" necessary to accommodate movement of the first link 408 and/or the second link 412. When, for example, the article 400 is moved from a substantially flat position to a curved or bent position by moving the first link 408 relative to the fixed portion 404 and/or the second link 412 relative to the first link 408, tension is applied to the flex connector 110, thereby taking up at least some of the slack and increasing the length of the flex connector 110. Manipulating the article 400 in this way can increase the length of the flex connector 110, with the magnitude of the length increase depending on any number of factors, including, for example, the distance between the flex connector 110 and the neutral plane of the article 400, the thickness of the interlayer 402 (e.g., the thinner the interlayer 402, the less the length will change), and the thickness of the display 18 (e.g., the thinner the display 18, the less the length will change). In some cases, manipulating the article 400 in this way can increase the length of the flex connector 110 by approximately 1.5 mm. Conversely, when the article 400 is moved back to the substantially flat position, compression is applied to the flex connector 110, thereby returning the flex connector 110 to its original shape, and, in turn, decreasing the length of the flex connector 110.

So constructed, the short tail ST of the article 400 is flexible, with a bending range close or substantially equal to the bending range of the dynamically flexible long tail LT (and a bending range that is much closer to the bending range of the long tail LT than the bending range of the semi-rigid short tail ST described above in FIG. 26C), such that the article 400 can accommodate the curvature of the surface (e.g., a wrist, an arm, etc.) around or on which the article 400 is to be disposed. Moreover, the article 400 maintains a maximum, viewable display area on the short tail ST and the long tail LT, particularly in situations in which the short tail ST (and/or the long tail LT) is curved to a greater degree, such as when curved around a user's wrist. At the same time, the article 400 mitigates the amount of stress to which the short tail ST, and more particularly the flexible connector 110, is subjected to over time. This is because (i) the fixed portion 404 and the first and second links 408, 412 provide for a controlled and more gradual bending of the short tail ST, and (ii) the flex connector 110 is specifically configured to slide and stretch as the short tail ST is bent.

It will be appreciated that the article 400 can vary and yet still mitigate the amount of stress to which the short tail ST, and more particularly the flexible connector 110, is subjected to over time. As an example, the length and/or the degree of the bend or curvature of the components of the short tail ST can be varied, according to, for example, the size and/or curvature of the object around or on which the article 400 is to be disposed. As another example, the shape and/or width of the slot 428 and/or the slot of the fixed portion 404 can be altered so as to vary the defined guide path for the pin 420 and/or the pin 440, and, in turn, vary the bending range of the short tail ST. In other cases, the connecting lines 102, 104, the at least one IC circuit 108, and/or the flex connector 110 can be arranged differently. For example, the at least one IC circuit 108 can be disposed on the flex connector 110. As another example, the flex connector 110 can be adhered to the interlayer 402 in a different location and/or to a different component, thereby producing a greater or lesser change in the length of the flex connector 110 as the article 400 is moved between different positions. If desired, the components of the short tail ST can be pivotally coupled to one another in a different manner. For example, the slot of the fixed portion 404 can instead be formed in the first link 408 and the pin 420 can instead be fixed to and extend outwardly from the fixed portion 404. Likewise, the slot 448 can instead be formed in the second link 412 and the pin 444 can instead be fixed to and extend outwardly from the first link 408. Further yet, the flexible short tail ST of article 400 can be effectuated using a different mechanism or mechanical structure than the pins and the slots described above, such as, for example, any one of the structures described in International Application No. PCT/US14/72328, filed Dec. 24, 2014, the entire disclosure of which is hereby expressly incorporated by reference herein for all uses and purposes.

Figure 26F:
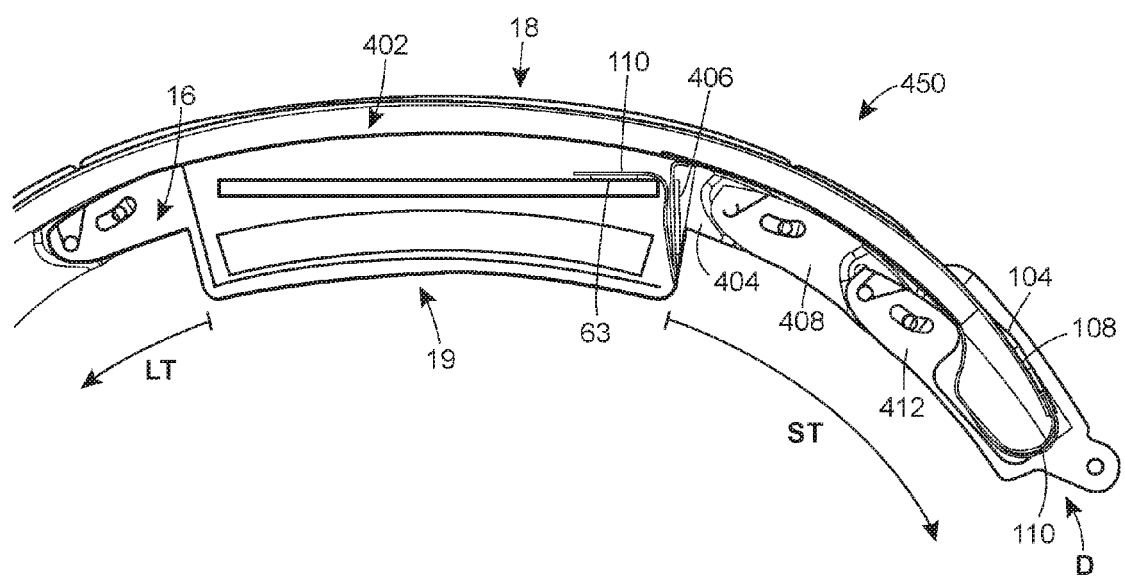
FIG. 26F illustrates a close-up, cross-sectional view of a portion of an elongated, dynamically flexible article having a flexible short tail constructed so as to mitigate the stresses to which the short tail would be subject to over time.

FIG. 26F illustrates another approach, implemented with an elongated dynamically flexible article 450 (only a portion of which is illustrated in FIG. 26F). The article 450 is similar to the article 400 illustrated in FIGS. 26D and 26E, with common components identified using common reference numerals. Like the article 400, the article 450 includes a flexible short tail ST, but the flexible short tail ST is implemented in a slightly different way. In this example, a bend (e.g., a 180 degree bend) in the flex connector 110 is fixed (e.g., adhered) at a location within the electronics module 19, and more particularly, between a circuit board 63 of the electronics module 19 and the fixed portion 404 of the short tail ST, as illustrated in FIG. 26F. The exact location at which the bend in the flex connector 110 is fixed within the electronics module 19 can, of course, vary. The article 450 also includes a spring 406 that is arranged in the electronics module 19 and is connected to a portion of the flex connector 110. The spring 406 in this example is a leaf spring, though other types of springs (e.g., a coil spring) can instead be used.

The spring 406 ensures that the flex connector 110 moves in the desired manner when the article 450 is moved between a substantially flat position and a curved or bent position. More specifically, the spring 406 ensures that the flex connector 110 moves (e.g., slides) under the interlayer 402, as desired, when the article 450 is moved between the substantially flat position and the curved or bent position. When, for example, the article 450 is moved from the substantially flat position to a curved or bent position by moving the first link 408 relative to the fixed portion 404 and/or the second link 412 relative to the first link 408, the flex connector 110 moves underneath the interlayer 402 such that a portion of the flex connector 110 moves inward into the electronic module 19, thereby decreasing the length of the flex connector 110 underneath the interlayer 402. In some cases, manipulating the article 450 in this way can decrease the length of the flex connector 110 underneath the interlayer 402 by approximately 1.5 mm. Other magnitudes of length changes are also possible, depending on, for example, the distance between the flex connector 110 and the neutral plane of the article 400, the thickness of the interlayer 402 (e.g., the thinner the interlayer 402, the less the length will change), the thickness of the display 18 (e.g., the thinner the display 18, the less the length will change), and/or the length of the short tail ST and/or the amount of angular change of the short tail ST. Conversely, when the article 450 is moved to a more flat position (e.g., the substantially flat position), the flex connector 110 moves underneath the interlayer 402 such that the portion of the flex connector 110 that moved inward into the electronic module 19 moves outward, out of the electronic module 19 and back underneath the interlayer 402 Moving the article 450 in this manner restores the length of the flex connector 110 underneath the interlayer 402 (i.e., increases the length of the flex connector 110 underneath the interlayer 402).

Much like the short tail ST of the article 400, the short tail ST of the article 450 is flexible, with a bending range close or substantially equal to the bending range of the dynamically flexible long tail LT (and a bending range that is much closer to the bending range of the long tail LT than the bending range of the semi-rigid short tail ST described above in FIG. 26C), such that the article 450 can accommodate the curvature of the surface (e.g., a wrist, an arm, etc.) around or on which the article 450 is to be disposed. Moreover, the article 450 maintains a maximum, viewable display area on the short tail ST and the long tail LT, particularly in situations in which the short tail ST (and/or the long tail LT) is curved to a greater degree, such as when curved around a user's wrist. At the same time, the article 450 mitigates the amount of stress to which the short tail ST, and more particularly the flexible connector 110, is subjected to over time. This is because (i) the fixed portion 404 and the first and second links 408, 412 provide for a controlled and more gradual bending of the short tail ST, and (ii) the flex connector 110 is specifically configured to slide as the short tail ST is bent.

It is envisioned that approaches other than those described in connection with FIGS. 25 and 26A-26F may be taken to mitigate the amount of stress to which the short tail ST of a dynamically flexible article is subjected to over time. As an example, one or more features and/or aspects of one of the approaches described herein could be combined with one or more features and/or aspects of one or more other approaches described herein and/or combined with one or more other features.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for implementing display features via a flexible electronic display on an attachable article as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed:

1. An elongated, dynamically flexible article comprising:
first and second longitudinal sides that are nonadjacent and first and second transverse sides that are nonadjacent, each of the first and second longitudinal sides having a respective length greater than each of the respective lengths of the first transverse sides;
a connection mechanism disposed proximate at least one of the first and second transverse sides of the article to allow the article to be releasably attached to itself;
an elongated, dynamically flexible substrate including a first portion on which an elongated, dynamically flexible optoelectronic area is disposed, the optoelectronic area including a set of optoelectronic elements, each of which is configured to at least one of emit, reflect, transflect, and absorb light, wherein the elongated, dynamically flexible substrate is bendable between a substantially flat position and a curved position;
a set of connecting lines disposed on a second portion of the flexible substrate;
a flexible connector of variable length extending from the transverse side of the article to communicatively couple the set of connecting lines with at least some of the optoelectronic elements and a set of driving circuits configured to send and/or receive signals to and/or from the at least some of the optoelectronic elements; and
an electronics module communicatively coupled to the set of driving circuits, the electronics module including a processor that indicates at least some of the signals for the set of driving circuits to send to the at least some of the optoelectronic elements,
wherein a first segment of the article extending between the first transverse side and the electronics module has a first length and a second segment of the article extending between the electronics module and the second transverse side has a second length, the second length being greater than the first length, and
wherein the first segment of the article has a maximum degree of dynamic flexibility less than that of the second segment of the article.

2. The elongated, dynamically flexible article of claim 1, wherein the first segment of the article is semi-rigid and the second segment of the article is dynamically flexible.

3. The elongated, dynamically flexible article of claim 2, wherein the first segment comprises a first portion and a second portion pivotally coupled to the first portion, the first portion integrally formed with and extending outwardly from the electronics module, and the second portion defining the first transverse side of the article.

4. The elongated, dynamically flexible article of claim 3, wherein the second portion is movably coupled to the first portion.

5. The elongated, dynamically flexible article of claim 4, wherein the second portion is pivotally coupled to the first portion via a pin and slot arrangement.

6. The elongated, dynamically flexible article of claim 5, further comprising a pin that is fixed to and extends outwardly from the second portion, the pin being movably disposed in a slot formed in the first portion, wherein the slot defines the maximum degree of dynamic flexibility of the first segment of the article.

7. The elongated, dynamically flexible article of claim 3, wherein the flexible connector experiences a change in length when the second portion is moved relative to the first portion.

8. The elongated, dynamically flexible article of claim 1, wherein each of the first and second segments is dynamically flexible, and wherein the first segment comprises a fixed portion integrally formed with and extending outwardly from the electronics module, a first link pivotally coupled to the fixed portion, and a second link pivotally coupled to the first link, the second link defining the first transverse side of the article.

9. The elongated, dynamically flexible article of claim 8, wherein the first link is pivotally coupled to the fixed portion via a first pin and slot arrangement and the second link is pivotally coupled to the first link via a second pin and slot arrangement.

10. The elongated, dynamically flexible article of 42, further comprising:
a first pin that is fixed to and extends outwardly from the first link, the first pin being movably disposed in a first slot formed in the fixed portion; and
a second pin that is fixed to and extends outwardly from the second link, the second pin being movably disposed in a second slot formed in the first link,
wherein the first and second slots define the maximum degree of dynamic flexibility of the first segment of the article.

11. The elongated, dynamically flexible article of claim 8, wherein the flexible connector is connected to at least one of the set of driving circuits, is folded around and under the flexible substrate, and is connected to the electronics module.

12. The elongated, dynamically flexible article of claim 8, wherein the flexible connector is freely movable in a region between the electronics module and a point at which the flexible connector is fixed to a portion of the article within the first segment.

13. The elongated, dynamically flexible article of claim 12, wherein the flexible connector has a serpentine shape in the region, such that the flexible connector has slack for accommodating movement of the first link and/or the second link.

14. The elongated, dynamically flexible article of claim 13, wherein when the article is moved from a first position to a second, more curved, position, tension is applied to the flexible connector, thereby taking up at least some of the slack and increasing a length of the flexible connector.

15. The elongated, dynamically flexible article of claim 8, further comprising a spring disposed in the electronics module and connected to a portion of the flexible connector to regulate movement of the flexible connector.

16. The elongated, dynamically flexible article of claim 8, wherein a bend in the flexible connector is fixed at a point within the electronics module.

17. The elongated, dynamically flexible article of claim 1, wherein:
the optoelectronic area is a display area;
the set of optoelectronic elements is a set of pixels; and
at least some of the signals provided by the set of driving circuits cause an image content based on the driving signals to be presented, on the display area, by using the set of pixels.

18. An elongated, dynamically flexible article comprising:
first and second longitudinal sides that are nonadjacent and first and second transverse sides that are nonadjacent, each of the first and second longitudinal sides having a respective length greater than each of the respective lengths of the first transverse sides;
a connection mechanism disposed proximate at least one of the first and second transverse sides of the article to allow the article to be releasably attached to itself;
an elongated, dynamically flexible substrate including a first portion on which an elongated, dynamically flexible optoelectronic area is disposed, the optoelectronic area including a set of optoelectronic elements, each of which is configured to at least one of emit, reflect, transflect, and absorb light;
a set of connecting lines disposed on a second portion of the flexible substrate;
a flexible connector extending from the transverse side of the article to communicatively couple the set of connecting lines with at least some of the optoelectronic elements and a set of driving circuits configured to send and/or receive signals to and/or from the at least some of the optoelectronic elements; and
an electronics module communicatively coupled to the set of driving circuits, the electronics module including a processor that indicates at least some of the signals for the set of driving circuits to send to the at least some of the optoelectronic elements,
wherein a first segment of the article extending between the first transverse side and the electronics module has a first length and a second segment of the article extending between the electronics module and the second transverse side has a second length, the second length being greater than the first length;
wherein the first segment comprises a fixed portion integrally formed with and extending outwardly from the electronics module, a first portion movably coupled to the fixed portion, a second portion movably coupled to the first portion, the flexible connector movably coupled to the second portion, wherein the length of the flexible connector varies based on the position of the first portion and second portion; and
wherein the first segment of the article has a maximum degree of dynamic flexibility less than that of the second segment of the article.

19. An elongated, dynamically flexible article comprising:
first and second longitudinal sides that are nonadjacent and first and second transverse sides that are nonadjacent, each of the first and second longitudinal sides having a respective length greater than each of the respective lengths of the first transverse sides;
a connection mechanism disposed proximate at least one of the first and second transverse sides of the article to allow the article to be releasably attached to itself;
an elongated, dynamically flexible substrate including a first portion on which an elongated, dynamically flexible optoelectronic area is disposed, the optoelectronic area including a set of optoelectronic elements, each of which is configured to at least one of emit, reflect, transflect, and absorb light;
a set of connecting lines disposed on a second portion of the flexible substrate;

a flexible connector extending from the transverse side of the article to communicatively couple the set of connecting lines with at least some of the optoelectronic elements and a set of driving circuits configured to send and/or receive signals to and/or from the at least some of the optoelectronic elements, wherein the flexible connector is slidable with respect to the elongated, dynamically flexible substrate; and an electronics module communicatively coupled to the set of driving circuits, the electronics module including a processor that indicates at least some of the signals for the set of driving circuits to send to the at least some of the optoelectronic elements, wherein a first segment of the article extending between the first transverse side and the electronics module has a first length and a second segment of the article extending between the electronics module and the second transverse side has a second length, the second length being greater than the first length, and wherein the first segment of the article has a maximum degree of dynamic flexibility less than that of the second segment of the article.

20. The elongated, dynamically flexible article of claim 1, wherein (i) the set of driving circuits is disposed on the flexible connector, and/or (ii) the flexible connector has a first end disposed on the optoelectronic area, a second end connected to the electronics module, and an intermediate portion that extends from the first end, is folded around and under the optoelectronic area, and extends toward the second end.

* * * * *